(12) United States Patent
Van de Ven et al.

(10) Patent No.: US 10,215,304 B2
(45) Date of Patent: Feb. 26, 2019

(54) THREE-WAY CONTROL VALVE

(71) Applicant: Regents of the University of Minnesota, Minneapolis, MN (US)

(72) Inventors: James D. Van de Ven, Long Lake, MN (US); Alexander C. Yudell, Minneapolis, MN (US); Shaun E. Koktavy, St. Louis Park, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 33 days.

(21) Appl. No.: 15/289,461

(22) Filed: Oct. 10, 2016

(65) Prior Publication Data
US 2017/0102092 A1 Apr. 13, 2017

Related U.S. Application Data

(60) Provisional application No. 62/238,820, filed on Oct. 8, 2015.

(51) Int. Cl.
*F16K 31/52* (2006.01)
*F16K 11/07* (2006.01)
(Continued)

(52) U.S. Cl.
CPC ........ *F16K 31/523* (2013.01); *F15B 13/0402* (2013.01); *F15B 13/0444* (2013.01);
(Continued)

(58) Field of Classification Search
CPC ..... Y10T 137/87748; Y10T 137/87732; Y10T 137/87708; Y10T 137/877; Y10T 137/8774; Y10T 137/87756; Y10T 137/87764; Y10T 137/87772; Y10T 137/8778; Y10T 137/8671;
(Continued)

(56) References Cited

U.S. PATENT DOCUMENTS 3,122,313 A * 2/1964 Glattli ................. F15B 13/0402
137/625.67
3,662,782 A * 5/1972 Schott ..................... F15B 13/04
137/596

(Continued)

FOREIGN PATENT DOCUMENTS

CN 2514153 Y 10/2002
CN 201884770 U 6/2011
(Continued)

*Primary Examiner* — Michael R Reid
(74) *Attorney, Agent, or Firm* — Dicke, Billig & Czaja, PLLC

(57) ABSTRACT

A 3-way high-speed valve including a housing, first and second spools, and an actuator mechanism. The spools are slidably disposed in bores of the housing. The housing further defines an inlet, first and second intermediate ports, and first and second outlets. The inlet is fluidly open to the first bore. The intermediate ports each fluidly connect the first and second bores. The first and second outlets are fluidly open to the second bore. The actuator mechanism articulates the spool bodies to generate differing flow conditions of the valve, including a first flow condition in which the inlet is fluidly connected to the first outlet, and a second flow condition in which the inlet is fluidly connected to the second outlet.

20 Claims, 17 Drawing Sheets

(51) Int. Cl.
*F16K 27/04* (2006.01)
*F15B 13/04* (2006.01)
*F15B 13/044* (2006.01)
*F15B 21/02* (2006.01)

(52) U.S. Cl.
CPC .......... *F15B 21/02* (2013.01); *F16K 11/0716* (2013.01); *F16K 27/041* (2013.01); *F15B 2211/30565* (2013.01); *F15B 2211/327* (2013.01); *F15B 2211/328* (2013.01)

(58) Field of Classification Search
CPC ..... Y10T 137/87169; Y10T 137/87177; F16K 31/523; F16K 27/041; F16K 11/0716; F16K 11/161; F15B 13/0444; F15B 21/02; F15B 13/0402; F15B 2211/328; F15B 2211/30565
USPC ....... 137/861, 862, 865, 867, 866, 868, 869, 137/870, 871, 596.12, 625.69, 596; 91/444–447
See application file for complete search history.

(56) References Cited

U.S. PATENT DOCUMENTS

| | | | |
|---|---|---|---|
| 4,136,655 A | 1/1979 | Mannhardt | |
| 4,345,108 A | 8/1982 | Dathe et al. | |
| 4,649,955 A | 3/1987 | Otto et al. | |
| 5,242,150 A | 9/1993 | Shiffler et al. | |
| 5,460,201 A * | 10/1995 | Borcea | F15B 13/0402 137/625.65 |
| 5,524,822 A | 6/1996 | Simmons | |
| 5,727,591 A | 3/1998 | Doll | |
| 6,047,949 A | 4/2000 | Beauchemin, Jr. | |
| 6,053,472 A | 4/2000 | Deland | |
| 6,386,229 B1 | 5/2002 | Morikawa et al. | |
| 6,457,698 B2 | 10/2002 | Wichmann | |
| 6,470,912 B1 * | 10/2002 | Haynes | F15B 13/0402 137/596 |
| 6,688,332 B2 * | 2/2004 | Liesenhoff | F15B 13/0402 137/596.16 |
| 6,808,162 B2 | 10/2004 | Tranovich et al. | |
| 8,286,939 B2 | 10/2012 | Li et al. | |
| 8,925,584 B2 | 1/2015 | Balmonet et al. | |
| 2003/0217772 A1 | 11/2003 | Lu et al. | |
| 2008/0083894 A1 | 4/2008 | Li et al. | |

FOREIGN PATENT DOCUMENTS

| | | |
|---|---|---|
| CN | 203565494 U | 4/2014 |
| DE | 2604208 A1 | 8/1977 |
| DE | 2819404 A1 | 11/1979 |
| DE | 2919404 A1 | 11/1980 |
| EP | 1298322 A1 | 4/2003 |

* cited by examiner

THREE-WAY CONTROL VALVE

CROSS-REFERENCE TO RELATED APPLICATIONS

This Non-Provisional Patent Application claims the benefit of the filing date of U.S. Provisional Patent Application Ser. No. 62/238,820, filed Oct. 8, 2015, entitled "THREE-WAY CONTROL VALVE," the entire disclosure of which is herein incorporated by reference

BACKGROUND

The present disclosure relates to valves. More particularly, it relates to high-speed valves useful, for example, with switch-mode hydraulic circuits.

Switch-mode hydraulics, analogous to switch-mode converters from the field of power electronics, is an emerging method of controlling hydraulic circuits. This concept utilizes a high-speed valve to switch between efficient on and off states, while temporarily storing energy in inductive and capacitive elements. The mean flow or pressure is controlled by the duty cycle, defined as the time in the on position divided by the switching period. Switch-mode hydraulics have been proposed for many end use applications, such as buck/boost converters, pumps, linear actuators, engine valve, and multiple actuators. The benefits of this approach are low cost, low weight, good response time, and improved efficiency over throttling valve control.

The valve in a switch-mode hydraulic circuit has a demanding set of competing requirements for the circuit to achieve good performance and high efficiency. A high performance circuit, defined by a fast response time and a low flow ripple, requires a fast valve switching frequency. However, a fast switching frequency creates three main challenges. First, high frequency valves typically use a low mass switching element to minimize the inertial actuation forces. The low mass typically correlates to a small flow area, requiring a balance between fully-open throttling loss and inertial force. Second, each switching event results in throttling across the partially-open transitioning valve. This energy loss can be minimized through soft switching or by reducing the valve transition time, at the expense of increasing the velocity of the switching element. Finally, each switching cycle incurs losses due to compressing and decompressing the fluid in the switched volume. The compressible energy loss can be minimized by reducing the switched volume between the valve and the inductive element.

Various known valve designs have been considered for switch-mode hydraulic circuit applications. For example, while the switching frequency limit for off-the-shelf solenoid valves is around 10 Hz, multiple researchers are attempting to develop high-speed valves specifically for switch-mode circuits. High-speed valve designs reported in the literature include: solenoid valves, poppet valves, linear spool valves, and continuously rotating axial and radial flow valves. Unfortunately, a viable valve design capable of optimally satisfying the high switching frequency and short valve transition requirements of switch-mode hydraulic circuits is not yet available.

In light of the above, a need exists for an improved valve architecture capable of providing a high switching frequency and useful, for example, with switch-mode hydraulic circuits.

SUMMARY

Some aspects of the present disclosure are directed toward a valve including a housing, first and second spool bodies, and an actuator mechanism. The housing defines first and second bores within which respective ones of the spool bodies are slidably disposed. The spool bodies are maintained substantially parallel by the housing in some embodiments. The housing further defines an inlet, first and second intermediate ports, and first and second outlets. The inlet is fluidly open to the first bore. The intermediate ports each fluidly connect the first and second bores. The first and second outlets are fluidly open to the second bore. The actuator mechanism is configured to articulate the spool bodies to generate differing flow conditions of the valve, including a first flow condition in which the inlet is fluidly connected to the first outlet, and a second flow condition in which the inlet is fluidly connected to the second outlet. In some embodiments, the valve can be repeatedly switched between the first and second flow conditions by repeated cycling of the actuator mechanism in which the valve transitions between: 1) a first arrangement in which the inlet is fluidly connected to the first outlet via the first intermediate port; 2) a second arrangement in which the inlet is fluidly connected to the second outlet via the first intermediate port; 3) a third arrangement in which the inlet is fluidly connected to the first outlet via the second intermediate port; and 4) a fourth arrangement in which the inlet is fluidly connected to the second outlet via the second intermediate port.

In some non-limiting embodiments, the crank-slider-driven 3-way high-speed valves of the present disclosure are useful with switch-mode hydraulic circuits or power at the frequencies required to achieve fast response and good control bandwidth, and along with other possible benefits (e.g., reasonable inertance tube lengths when optionally employed with switched inertance converter circuits). Furthermore, the mechanical coupling to the valve makes the open area of the valve known at all times by measuring the crank angle, allowing easy comparison to numerical simulations. The valves of the present disclosure can be designed for any flow and pressure. In some non-limiting examples, the valves of the present disclosure can be optimized for a given rated pressure of 34.5 MPa and volumetric flow rate of 22.8 L/min. The resulting valve is, for example, capable of transitioning to the on-state in 5% of the switching period, where the on state is defined as a pressure drop of 345 kPa or less at the rated flow, or a minimum transition time of 0.42 ms. The non-limiting example optimization process minimized the combined leakage and viscous friction losses on the sliding spool over a crank rotation, yielding a 1.7% energy loss relative to the flow energy over a cycle in the highest loss operating scenario.

DETAILED DESCRIPTION

Figure 1:
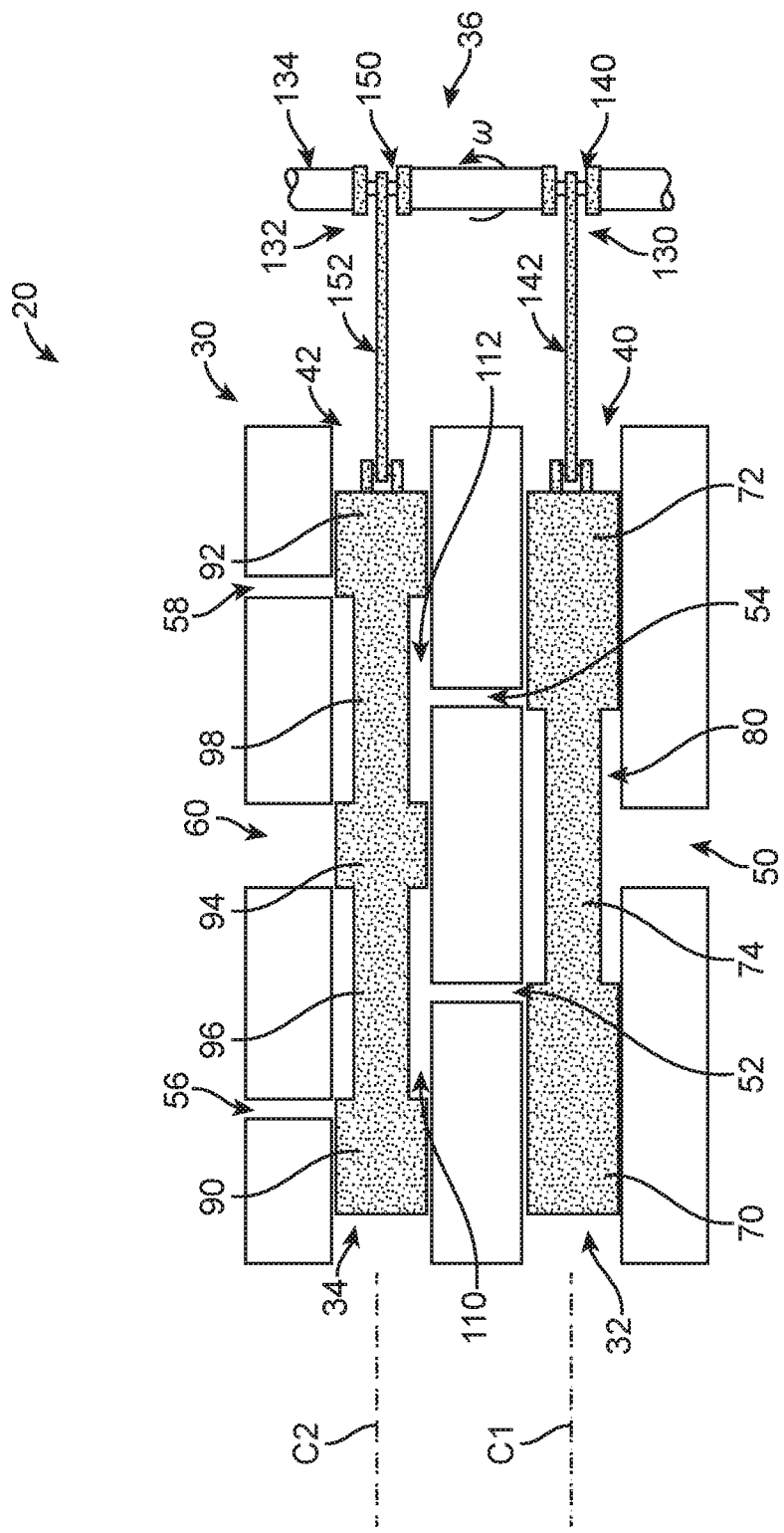
FIG. 1 is a schematic illustration of a valve in accordance with principles of the present disclosure, including first and second spool bodies each in a neutral position.

One embodiment of a three-way valve 20 in accordance with principles of the present disclosure is shown in FIG. 1. The valve 20 includes a housing assembly (or valve block) 30 (referenced generally), a first spool body (or more simply a "spool") 32, a second spool body (or "spool") 34 and an actuator mechanism 36. Details on the various components are provided below. In general terms, the spool bodies 32, 34 are slidably disposed within respective bores formed by the housing assembly 30, and are manipulated (e.g., translated axially) by operation of the actuator mechanism 36 to selectively fluidly connect alternating ports in the housing assembly 30. As described in greater detail below, the actuator mechanism 36 incorporates a crank slider driven architecture operating on a common crankshaft to drive the spool bodies 32, 34. As a point of reference, FIG. 1 illustrates the spool bodies 32, 34 as critically lapped, which prevents cross porting during transition. Alternatively, it is possible to incorporate a different spool open length (i.e., decreased spool open length or increased spool open length) to create an overlapped valve transition or an underlapped valve transition. The valves of the present disclosure have multiple different end use application as will be apparent to those of ordinary skill, and in some embodiments are useful with switch-mode hydraulic circuits at the frequencies necessary to achieve fast response and good control bandwidth, along with other possible benefits as appropriate for a particular end-use application (e.g., reasonable inertance tube lengths for switched inertance converter circuits).

The housing assembly 30 can assume various forms, and defines a first bore 40 and a second bore 42. For example, the housing assembly 30 can be or include a material block 44 into which the bores 40, 42 are formed. Other constructions are also envisioned (e.g., hollowed cylinders, sleeves or similar tubular structures each defining one of the bores 40, 42 can be separately formed and assembled to one another). Regardless, the housing assembly 30 spatially fixes the bores 40, 42 relative to one another, with the bores 40, 42 being substantially parallel (i.e., within 10% of a truly parallel relationship), such as a central axis C1 of the first bore 40 being substantially parallel with a central axis C2 of the second bore 40.

The housing assembly 30 further defines an inlet 50 that is fluidly open to the first bore 40, and first and second intermediate (or internal) ports 52, 54 that are each fluidly open to both of the first and second bores 40, 42. The housing assembly 30 also defines first and second outlets that are fluidly open to the second bore 42. In some embodiments, the first and second outlets are established via first-third outlet ports 56-60. Though not shown in FIG. 1, the first and second outlet ports 56, 58 are, in some non-limiting embodiments, fluidly connected downstream of the second bore 42 (either internally within the material block 44, or external the material block 44 by various passage-forming bodies (not shown) mounted to the material block 44). It will be understood, then, that in the descriptions below, the first and second outlet ports 56, 58 behave as a single outlet. The third outlet port 60 serves as the second outlet of the housing assembly. Other outlet port configurations can also be employed that may or may not include the first and second outlet ports 56, 58 behaving as a single outlet. The inlet 50 and the outlets of the housing assembly 30 can assume various forms known to those of ordinary skill that promote fluid connection to other fluid circuit components.

The first spool body 32 is configured to be slidably received within the first bore 40, and includes or defines first and second blocking regions (or lands) 70, 72, and a flowing region 74. An outer geometry (diameter or other dimension) of the blocking regions 70, 72 corresponds with a diameter (i.e., approximates) of the first bore 40. An outer geometry (diameter or other dimension) of the flowing region 74 is appreciably less than that of the blocking regions 70, 72 and thus less than the diameter of the first bore 40. With this construction, when the first spool body 32 is positioned relative to the housing assembly 30 such that the first blocking region 70 is aligned with the first intermediate port 52, the first spool body 32 blocks the first intermediate port 52 and prevents fluid flow from the inlet 50 to the first intermediate port 52. Similarly, when the first spool body 32 is positioned relative to the housing assembly 30 such that the second blocking region 72 is aligned with the second intermediate port 54, the first spool body 32 blocks the second intermediate port 54 and prevents fluid flow from the inlet 50 to the second intermediate port 54. Conversely, when the first spool body 32 is positioned relative to the housing assembly 30 such that the flowing region 74 is aligned with the first intermediate port 52 (i.e., the first spool body 32 is transitioned leftward relative to the orientation of FIG. 1), the first spool body 32 establishes an open fluid path between the inlet 50 and the first intermediate port 52. When the first spool body 32 is positioned relative to the housing assembly 30 such that the flowing region 74 is aligned with the second intermediate port 54 (i.e., the first spool body 32 is transitioned rightward relative to the orientation of FIG.

1), the first spool body 32 establishes an open fluid path between the inlet 50 and the second intermediate port 54.

Figure 2A:
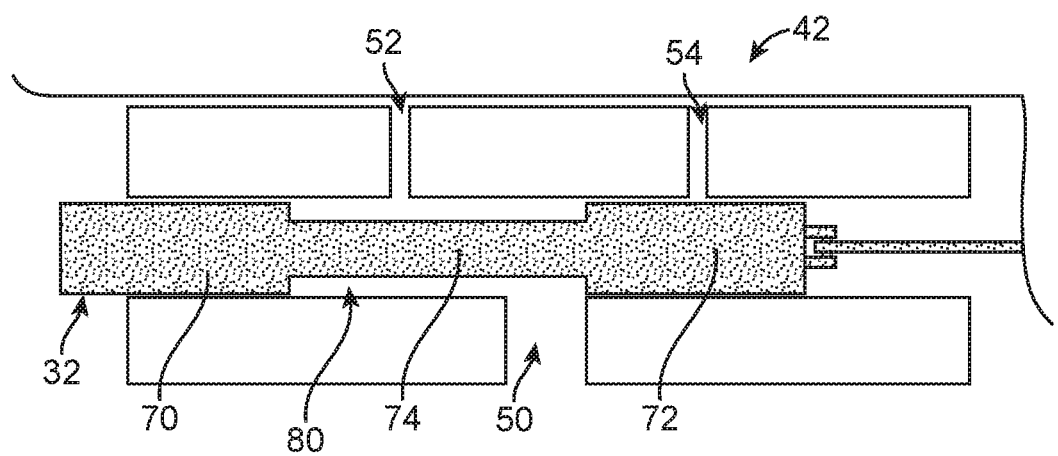
FIG. 2A schematically illustrates a first position of the first spool body of the valve of FIG. 1.

Commensurate with the above explanations, the housing assembly 30 and the first spool body 32 are configured to collectively provide at least three flow-affecting positions of the first spool body 32. For ease of understanding, it can be helpful to view the housing assembly 30 and the first spool body 32 as combining to define a chamber 80 within the first bore 40. The first spool body 32 is sized and positioned relative to the second bore 40 such that the chamber 80 is always open to the inlet 50 and is selectively open to one of first and second intermediate ports 52, 54. In a neutral position (reflected by FIG. 1), the first blocking region 70 is aligned with the first intermediate port 52 and the second blocking region 72 is aligned with the second intermediate port 54. In the neutral position, then, both of the intermediate ports 52, 54 are blocked by the first spool body 32, and fluid from the inlet 50 will not flow to the second bore 42. In a first position, the flowing region 74 is aligned with the first intermediate port 52 and the second blocking region 72 is aligned with the second intermediate port 54 (i.e., the first spool body 32 is transitioned leftward relative to the housing assembly 30 from the arrangement of FIG. 1). In other embodiments, the valve 20 can be underlapped. An example of the first position of the first spool body 32 relative to the housing assembly 30 is provided by the partial view of FIG. 2A. In the first position, fluid from the inlet 50 is permitted to flow from the chamber 80 to the second bore 42 (referenced generally) via the first intermediate port 52; however, fluid is prevented from flowing to the second bore 42 via the second intermediate port 54. Returning to FIG. 1, in a second position, the flowing region 74 is aligned with the second intermediate port 54 and the first blocking region 70 is aligned with the first intermediate port 52 (i.e., the first spool body 32 is transitioned rightward relative to the housing assembly 30 from the arrangement of FIG. 1). In the second position, fluid from the inlet 50 is permitted to flow from the chamber 80 to the second bore 42 via the second intermediate port 54; however, fluid is prevented from flowing to the second bore 42 via the first intermediate port 52.

The second spool body 34 is configured to be slidably received within the second bore 42, and includes or defines first-third blocking regions (or lands) 90-94, and first and second flowing regions 96, 98. An outer geometry (diameter or other dimension) of the blocking regions 90-94 corresponds with a diameter (i.e., approximates) of the second bore 42. Further, a length of the third blocking region 94 (i.e., dimension in a direction of the central axis C2) approximates (e.g., is slightly larger than) a diameter (or other outer dimension) of the third outlet port 60 for reasons made clear below. An outer geometry (diameter or other dimension) of the flowing regions 96, 98 is appreciably less than that of the blocking regions 90-94 and thus less than the diameter of the second bore 42. With this construction, the second spool body 34 can be transitioned through various positions relative to the housing assembly 30 at which various ones of the outlet ports 56-60 are or are not blocked by the corresponding blocking region 90-94 (i.e., the first blocking region 90 blocks or does not block the first outlet port 56; the second blocking region 92 does or does not block the second outlet port 58; the third blocking region 94 does or does not block the third outlet port 60). Stated otherwise, the second spool body 34 can be positioned relative to the housing assembly 30 such that the first flowing region 96 is aligned with the first outlet port 56, is at least partially aligned with the third outlet port 60, or is not aligned with either of the first or third outlet ports 56, 60; and the second flowing region 98 is aligned with the second outlet port 58, is at least partially aligned with the third outlet port 60, or is not aligned with either of the second or third outlet ports 58, 60.

Commensurate with the above explanations, the housing assembly 30 and the second spool body 34 are configured to collectively provide at least three flow-affecting positions of the second spool body 34. For ease of understanding, it can be helpful to view the housing assembly 30 and the second spool body 34 as combining to define first and second chambers 110, 112 within the second bore 42. The first chamber 110 corresponds with the first flowing region 96 and the second chamber 112 corresponds with the second flowing region 98. The second spool body 34 is sized and positioned relative to the second bore 42 such that the first chamber 110 is always open to the first intermediate port 52 and is selectively open to one of first and third outlet ports 56, 60; the second chamber 112 is always open to the second intermediate port 54 and is selectively open to one of the second and third outlet ports 58, 60. In a neutral position (reflected by FIG. 1), the first blocking region 90 is aligned with the first outlet port 56, the second blocking region 92 is aligned with the second outlet port 58, and the third blocking region 94 is aligned with the third outlet port 60. In the neutral position, then, the first chamber 110 is open to the first intermediate port 52 but is closed or blocked relative to the first and third outlet ports 56, 60; and the second chamber 112 is open to the second intermediate port 54 but is closed or blocked relative to the second and third outlet ports 58, 60.

In a first position, the second spool body 34 is transitioned leftward relative to the orientation of FIG. 1 such that the third blocking region 94 only partially covers the third outlet port 60. The first chamber 110 is open to the first outlet port 56 but is closed to the third outlet port 60 (i.e., first blocking region 90 is not aligned with the first outlet port 56, and the third blocking region 94 is fluidly between the first intermediate port 52 and the third outlet port 60). Thus, to the extent fluid flow is present at the first intermediate port 52, this fluid flow is permitted to progress to the first outlet port 56 and is prevented from flowing to the third outlet port 60. Also, the second chamber 112 is open to the third outlet port 60 but is closed to the second outlet port 58 (i.e., the second blocking region 92 is aligned with the second outlet port 58, and at least a portion of the third outlet port 60 is open relative to the third blocking region 94). Thus, to the extent fluid flow is present at the second intermediate port 54, this fluid flow is permitted to progress to the third outlet port 60 and is prevented from flowing to the second outlet port 58.

Figure 2B:
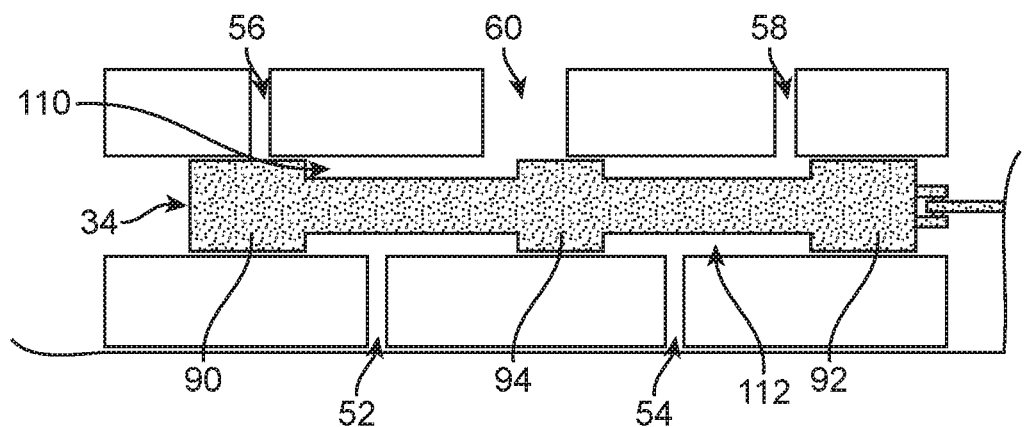
FIG. 2B schematically illustrates a second position of the second spool body of the valve of FIG. 1.

In a second position, the second spool body 34 is transitioned rightward relative to the orientation of FIG. 1 such that the third blocking region 94 only partially covers the second third outlet port 60. An example of the second position of the second spool body 34 relative to the housing assembly 30 is provided in FIG. 2B. The first chamber 110 is closed to the first outlet port 56 and is open to the third outlet port 60 (i.e., first blocking region 90 is aligned with the first outlet port 56, and at least a portion of the third outlet port 60 is open relative to the third blocking region 94). Thus, to the extent fluid flow is present at the first intermediate port 52, this fluid flow is permitted to progress to the third outlet port 60 and is prevented from flowing to the first outlet port 56. Also, the second chamber 112 is open to the second outlet port 58 but is closed to the third outlet port 60 (i.e., the second blocking region 92 is not aligned with the second outlet port 58, and the third blocking region 94 is fluidly between the second intermediate port 54 and the third outlet port 60). Thus, to the extent fluid flow is present at the second intermediate port 54, this fluid flow is permitted to progress to the second outlet port 58 and is prevented from flowing to the third outlet port 60.

Returning to FIG. 1, the spool bodies 32, 34 are substantially parallel to one another (corresponding with the substantially parallel relationship of the bores 40, 42), and can be axially transitioned between the various positions described above in a manner that selectively completes a discrete fluid pathway between the inlet 50 and one of the three outlet ports 56-60. Each combination of spool body 32, 34 positions is defined herein as an "arrangement" of the valve 20 (e.g., one arrangement of the valve 20 consists of the first spool body 32 in the first position and the second spool body 34 in the first position; another arrangement of the valve 20 consists of the first spool body 32 in the first position and the second spool body 34 in the second position; etc.). With embodiments in which the first and second outlet ports 56, 58 are commonly connected to a first outlet (and the third outlet port 60 is connected to or serves as a second outlet), then, transitioning of the valve 20 between the various arrangements will effectuate a switching flow from the inlet 50 to the two outlets. In a first flow condition, the inlet is fluidly connected to the first outlet, and in a second flow condition, the inlet is fluidly connected to the second outlet. In order to provide high frequency response or transitioning between the two flow conditions, the valve 20 is repeatedly cycled through four different flow arrangements of the spool bodies 32, 34; the first flow condition (i.e., inlet fluidly connected to the first outlet) is achieved in two of the four flow arrangements, and the second flow condition (i.e., inlet fluidly connected to the second outlet) is achieved in the other two flow arrangements.

In a neutral arrangement of FIG. 1, the first spool body 32 and the second spool body 34 are both in the neutral position. Fluid flow at the inlet 50 is permitted to enter the chamber 80, but is prevented from flowing to the second bore 42 (and thus is prevented from flowing to the outlet ports 56-60).

Figure 3A:
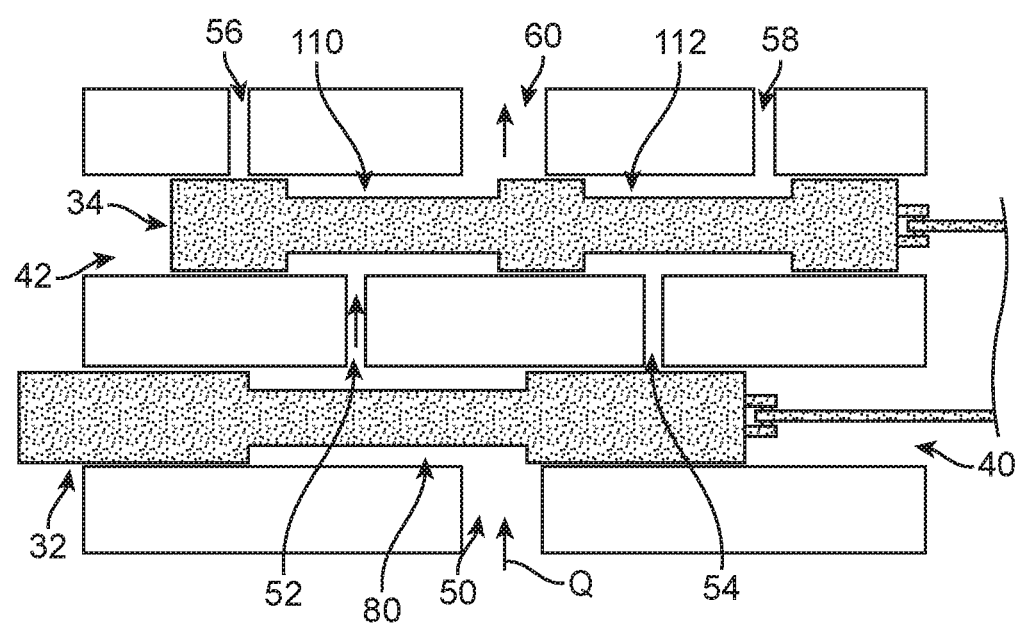
FIGS. 3A-3D schematically illustrate four flow arrangements of the valve of FIG. 1.

In a first flow arrangement shown in FIG. 3A, the first spool body 32 is in the first position, and the second spool body 34 is in the second position. Fluid flow Q at the inlet 50 is permitted to progress through the chamber 80, the first intermediate port 52, and the third outlet port 60 (via the first chamber 110). The second spool body 34 blocks the first outlet port 56 so as to prevent fluid flow thereto. Although the second spool body 34 is positioned such that the second chamber 112 is open to the second outlet port 58, because the second intermediate port 54 is closed or blocked by the first spool body 32, no fluid flow to the second chamber 112, and thus to the second outlet port 58, will occur.

Figure 3B:
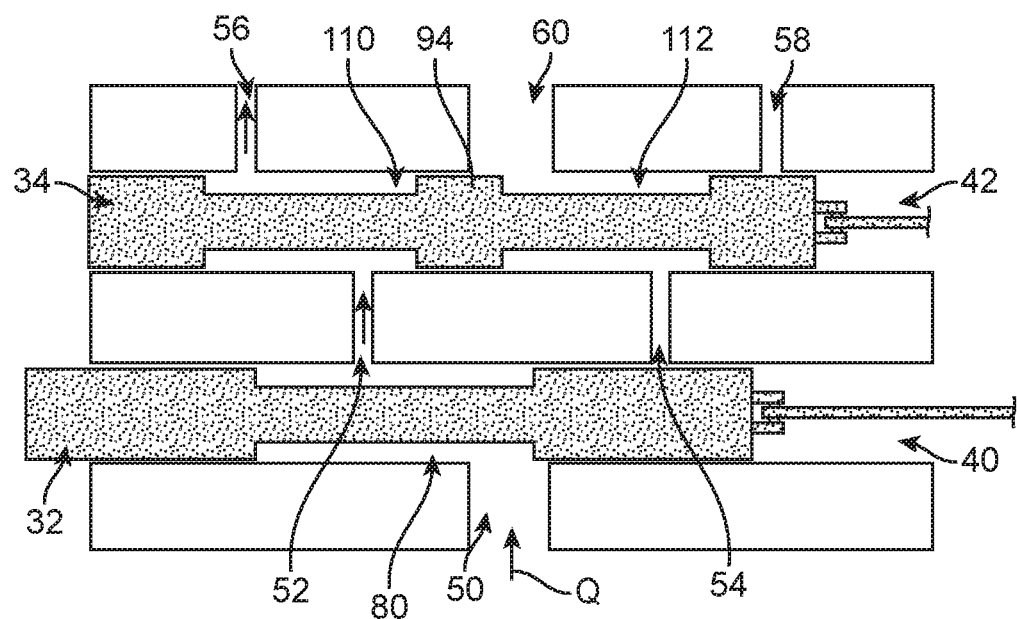

In a second possible flow arrangement shown in FIG. 3B, the first spool body 32 is in the first position, and the second spool body 34 is in the first position described above (i.e., the first chamber 110 is open to the first outlet port 56, and the second chamber 112 is open to the third outlet port 60). In the second arrangement, fluid flow Q at the inlet 50 is permitted to progress through the chamber 80, the first intermediate port 52, and the first outlet port 56 (via the first chamber 110). The third blocking region 94 blocks the third outlet port 60 relative to the first chamber 110 so as to prevent fluid flow thereto. Further, although the second spool body 34 is positioned such that the second chamber 112 is open to the third outlet port 60, because the second intermediate port 54 is closed or blocked by the first spool body 32, no fluid flow to the second chamber 112, and thus to the third outlet port 58, will occur.

Figure 3C:
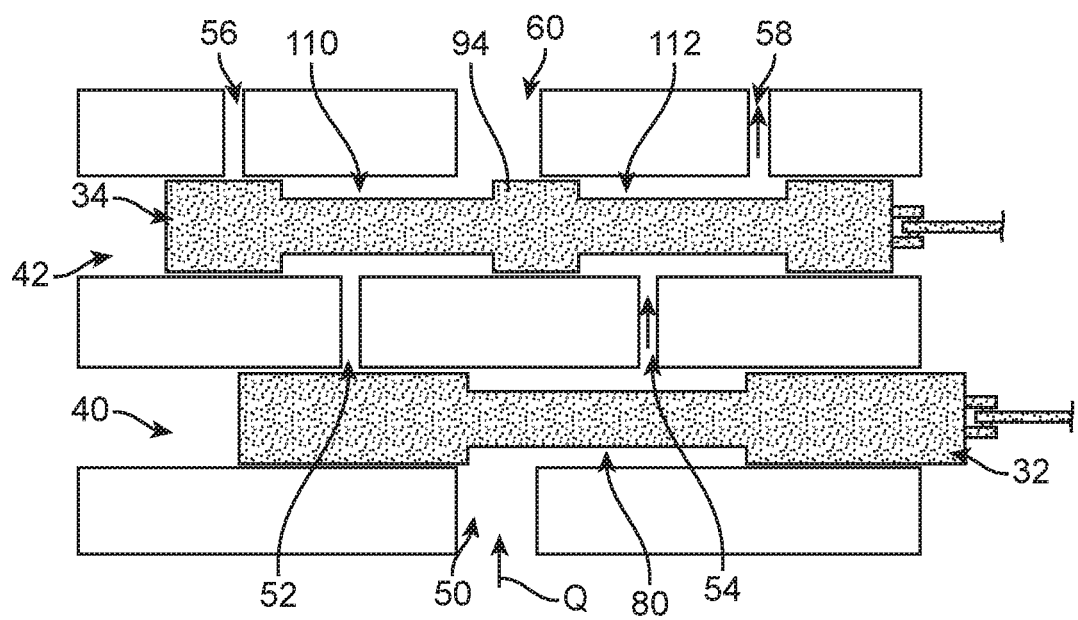

In a third possible flow arrangement shown in FIG. 3C, the first spool body 32 is in the second position described above (i.e., the inlet 50 is open to the second intermediate port 54 via the chamber 80, and the first intermediate port 52 is blocked), and the second spool body 34 is in the second position. Fluid flow Q at the inlet 50 is permitted to progress through the chamber 80, the second intermediate port 54, and the second outlet port 58 (via the second chamber 112). The third blocking region 94 of the second spool body 34 blocks the third outlet port 60 relative to the second chamber 112 so as to prevent fluid flow thereto. Further, although the second spool body 34 is positioned such that the first chamber 110 is open to the third outlet port 60, because the first intermediate port 52 is closed or blocked by the first spool body 32, no fluid flow to the first chamber 110, and thus to the third outlet port 60, will occur.

Figure 3D:
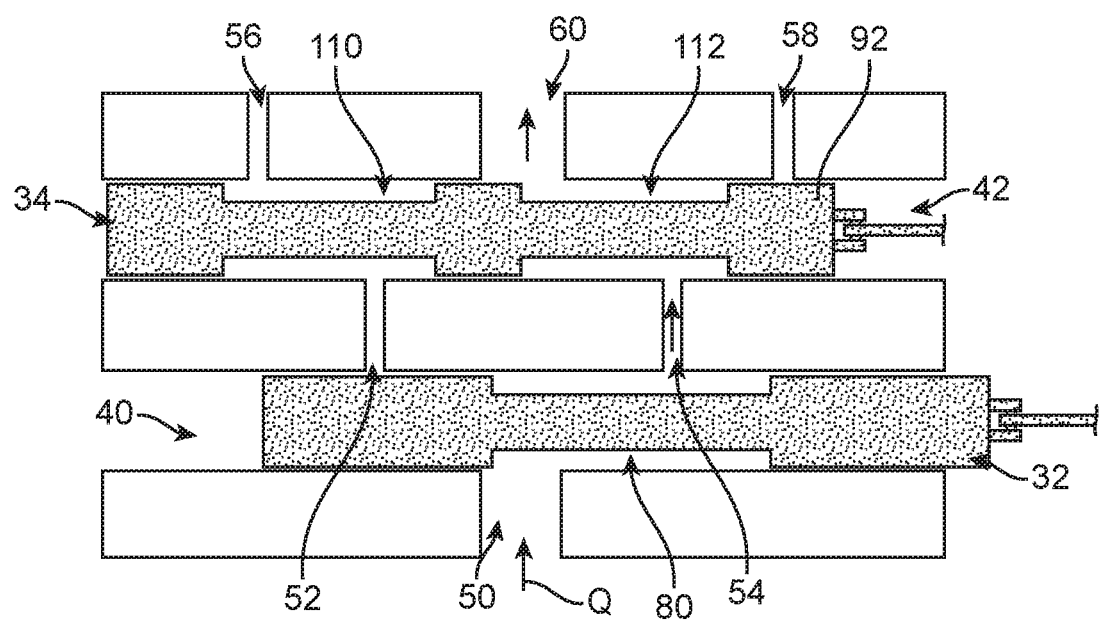

In a fourth possible flow arrangement shown in FIG. 3D, the first spool body 32 is in the second position described above (i.e., the inlet 50 is open to the second intermediate port 54 via the chamber 80, and the first intermediate port 52 is blocked), and the second spool body 34 is in the first position described above (i.e., the first chamber 110 is open to the first outlet port 56, and the second chamber 112 is open to the third outlet port 60). Fluid flow Q at the inlet 50 is permitted to progress through the chamber 80, the second intermediate port 54, and the third outlet port 60 (via the second chamber 112). The second blocking region 92 of the second spool body 34 blocks the second outlet port 58 relative to the second chamber 112 so as to prevent fluid flow thereto. Further, although the second spool body 34 is positioned such that the first chamber 110 is open to the first outlet port 56, because the first intermediate port 52 is closed or blocked by the first spool body 32, no fluid flow to the first chamber 110, and thus to the first outlet port 56, will occur.

Returning to FIG. 1, the actuator mechanism 36 incorporates a crank slider driven architecture operating upon a common crankshaft to repeatedly cycle the spool bodies 32, 34 through the arrangements described above, delivering fluid to the first outlet (via the first and second outlet ports 56, 58) and the second outlet (via the third outlet port 60) in an alternating or switching fashion. The actuator mechanism 36 can assume various forms appropriate for effectuating axial translation of the spool bodies 32, 34 relative to the housing assembly 30 via a common crankshaft. In some embodiments, the actuator mechanism 36 is akin to a two, four-bar crank-slider mechanism, with the spool bodies 32, 34 serving as the slider links. For example, the actuator mechanism 36 can include a first linkage 130 (referenced generally), a second linkage 132 (referenced generally) and a crankshaft 134. The first linkage 130 connects or links the first spool body 32 to the crankshaft 134, and the second linkage 132 connects or links the second spool body 34 to the crankshaft 134. With this construction, then, the spool bodies 32, 34 are commonly driven by the crankshaft 134 which ensures fixed relative positions of the linkages 130, 132.

Figure 4:
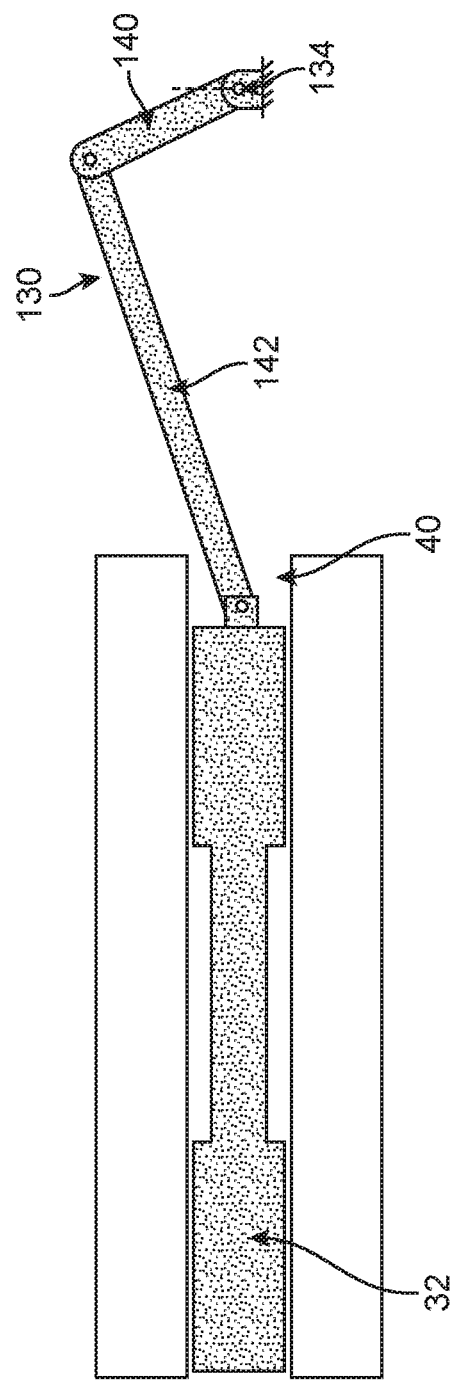
FIG. 4 is a simplified illustration of a portion of the valve of FIG. 1, including a linkage associated with the first spool body.

The first and second linkages 130, 132 can be identical in some embodiments. One example of the first linkage 130 is shown in FIG. 4, and includes a crank link or arm 140 and a coupler link or arm 142. The crank link 140 is attached to (and thus driven or rotated by) the crankshaft 134. The coupler link 142 is pivotably connected at opposite ends thereof to the crank link 140 and the first spool body 32. With rotation of the crankshaft 134, the linkage 130 effectuates axial translation of the first spool body 32 relative to the first bore 40 in a back-and-forth fashion. Returning to FIG. 1, the second linkage 132 can also include a crank link 150 (referenced generally) and a coupler link 152 connected to the second spool body 34. Various devices (not shown) can be included with (or connected to) the actuator mechanism for driving the crankshaft 134 (that in turn commonly drives the spool bodies 32, 34); for example, a motor (e.g., AC induction motor) can be provided. Other actuation formats operating on a common crankshaft as part of a crank slider driven architecture are also encompassed by the present disclosure, including electromagnetic actuation. The drive or power source can be controlled in various fashions as apparent to those of ordinary skill, including a logic-type controller operating to preform predetermined instructions (e.g., hardware or software).

Figure 5:
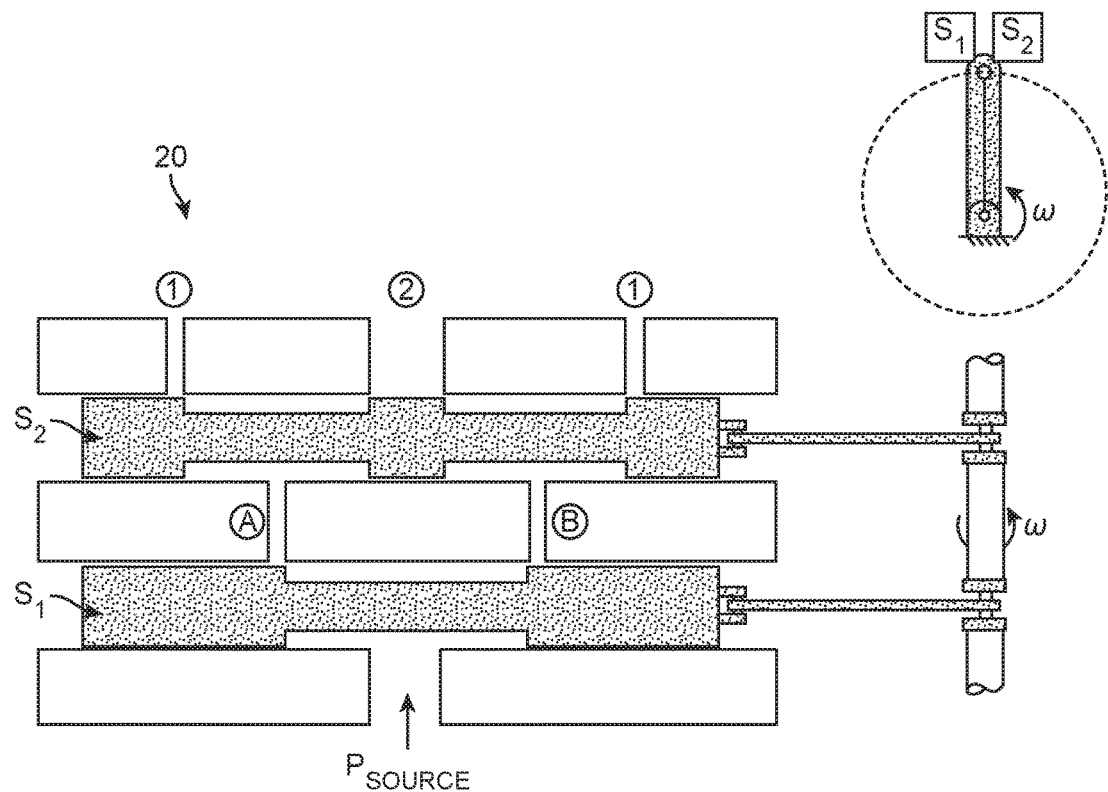
FIG. 5 is a schematic illustration of the valve of FIG. 1.

Various possible operational features provided by or incorporated with the linkage-based valve architectures of the present disclosure are described in greater detail below with reference to additional figures that are highly akin to the figures discussed above, but making use of different element identification schemes. With this in mind, FIG. 5 is another representation of the valve 20 of the present disclosure. Once again, spools (or spool bodies) $S_1$, $S_2$ are translated axially in a fixed valve housing, allowing connection of alternating ports in the housing. The spools $S_1$, $S_2$ are driven by a common crankshaft which ensures fixed relative position of the crank arms. The valve arrangement of FIG. 5 is critically lapped, which can be desirable to prevent cross-porting while minimizing the time which the flow path is blocked. Two of the outlet ports are labeled with the identifier "1" in FIG. 5, and a third outlet port is labeled with the identifier "2". Both outlet ports labeled 1 would be connected either internally or externally to valve, behaving as a single outlet. Unless stated otherwise, "first outlet port 1" in the explanations below is in reference to fluid connection or flow at single outlet of the valve 20 via either of the outlet ports labeled as "1". Fluid flow or pressure at an inlet of the valve 20 is denoted as P$_{SOURCE}$ and angular velocity of the crank shaft is designated as ω. The inset to FIG. 5 reflects alignment of the crank arms of the spools $S_1$, $S_2$ in the neutral position.

The duty cycle of the valve 20 is defined as ratio of time that the source is connected to the first outlet port 1 to switching period time. Valve duty cycles from 0 to 1 can be achieved by adjusting the phase angle between the spools $S_1$, $S_2$ from 0 to π radians. This phase shift modulation approach allows continuous adjustment of duty cycle and results in two switching cycles per revolution of the crank arm.

The first spool $S_1$ switches the source flow between the internal or intermediate ports A, B, while the second spool $S_2$ alternates between connecting the first intermediate port A to the first outlet port 1 and the second intermediate port B to the second outlet port 2 and vice-versa. The axial location of a spool $S_1$, $S_2$ in the blocking position is referred to as the neutral position.

Figure 6:
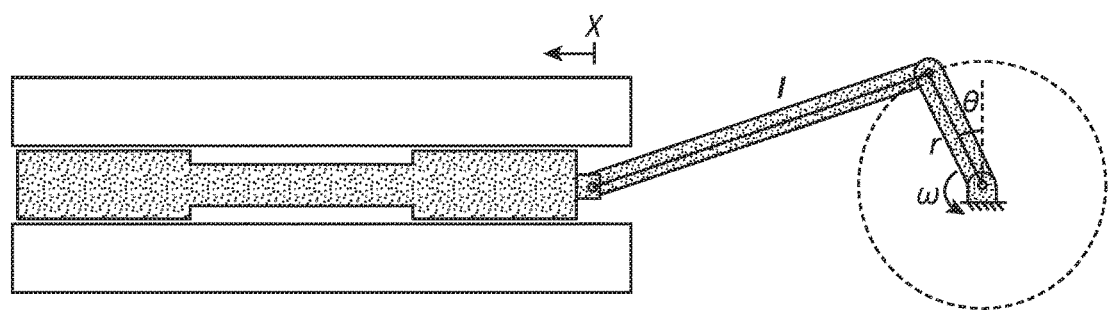
FIG. 6 illustrates the kinematics of the non-offset crank-slider mechanism provided with the valve of FIG. 1.

From the kinematics of a non-offset crank-slider mechanism, shown in FIG. 6, the slider (or spool) position is described by Equation (1) below:

$$x(\theta) = r\sin\theta + l\sqrt{1 - \left(\frac{r}{l}\cos\theta\right)^2} - \sqrt{l^2 + r^2} \quad (1)$$

where x(θ) is the displacement of the spool relative to the neutral position, r is the length of the crank link, l is the length of the coupler link, and θ is the angle of the crank arm with respect to the neutral position. The crank angle θ is measured from the neutral position which is shown with a dotted line in FIG. 6.

Differentiating the position with respect to time yields the velocity of the spool in terms of angular displacement of the crank, θ, relative to the vertical axis as in Equation (2) below:

$$v(\theta) = r\omega\left(\cos\theta - \frac{r}{l}\frac{\sin\theta\cos\theta}{\sqrt{1 - \left(\frac{r}{l}\cos\theta\right)^2}}\right) \quad (2)$$

where ω is the angular velocity of the crank link.

When the length of the coupler link, l, is long relative to the crank link, r, the maximum absolute spool velocity occurs when the crank arm is perpendicular to the slider link travel, or θ=0 and θ=π with respect to the neutral position. As the valve transition time is dependent on the spool velocity during the port switching, the transition time is minimized by having the valve spool transition from one port to the other at the peak spool velocity. After transition, the spools decelerate to zero velocity at the ends of their travel. The nature of the slider link velocity profile accomplishes two design goals: 1) Transition at maximum spool velocity to minimize throttling losses; and 2) Reduce velocity outside of transition periods to reduce frictional and viscous losses. A flywheel on the crankshaft stores kinetic energy when the spool is decelerating and releases the energy during spool acceleration.

Figure 7:
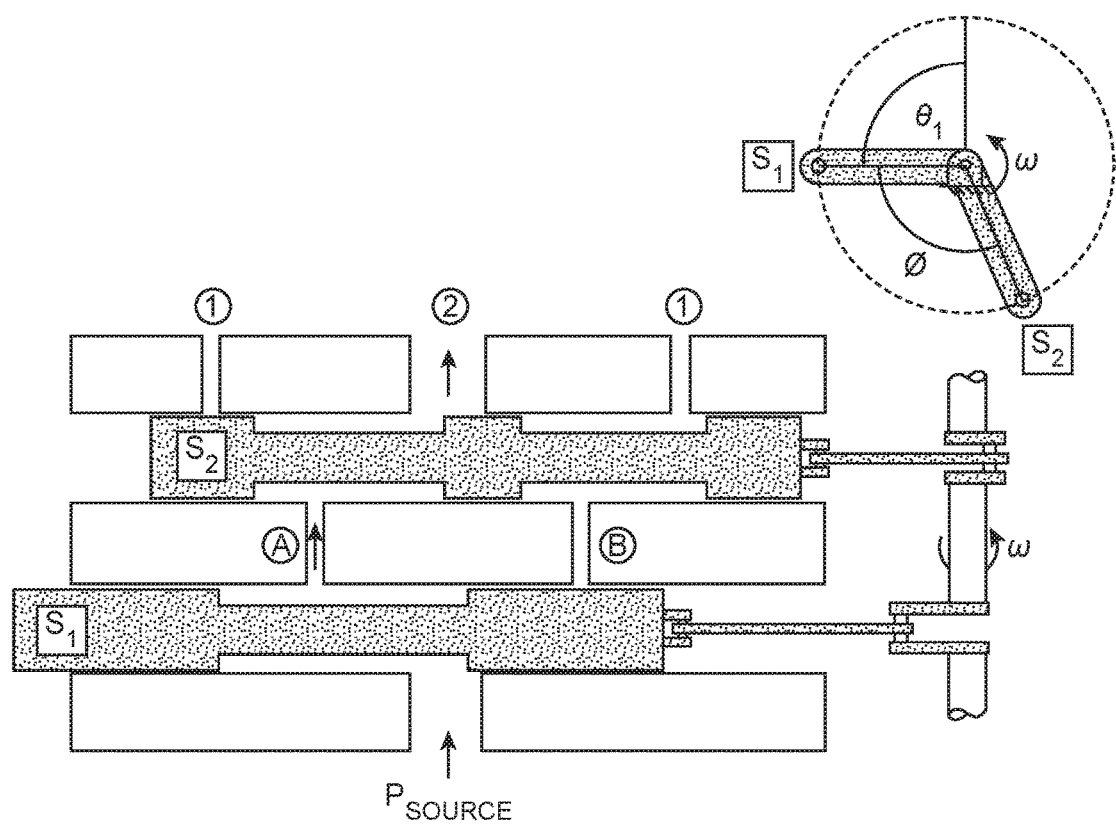
FIG. 7 illustrates the valve of FIG. 1 in possible arrangement during use.

There are multiple flow paths through the valve depending on the crank position and phase shift between the spools. FIG. 7 demonstrates the flow path through the valve for a crank arm phase shift of φ radians, when the first spool $S_1$ is displaced by $\theta_1 = \pi/2$ radians. The spools $S_1$, $S_2$ are φ out of phase, with the first spool $S_1$ π/2 radians past the neutral position, at maximum displacement. The flow path (indicated by arrows) is through the first internal port A and then to the second outlet port 2. At this instance, the second internal port B is blocked, as a result there is no flow through either outlet port 1.

Figure 8:
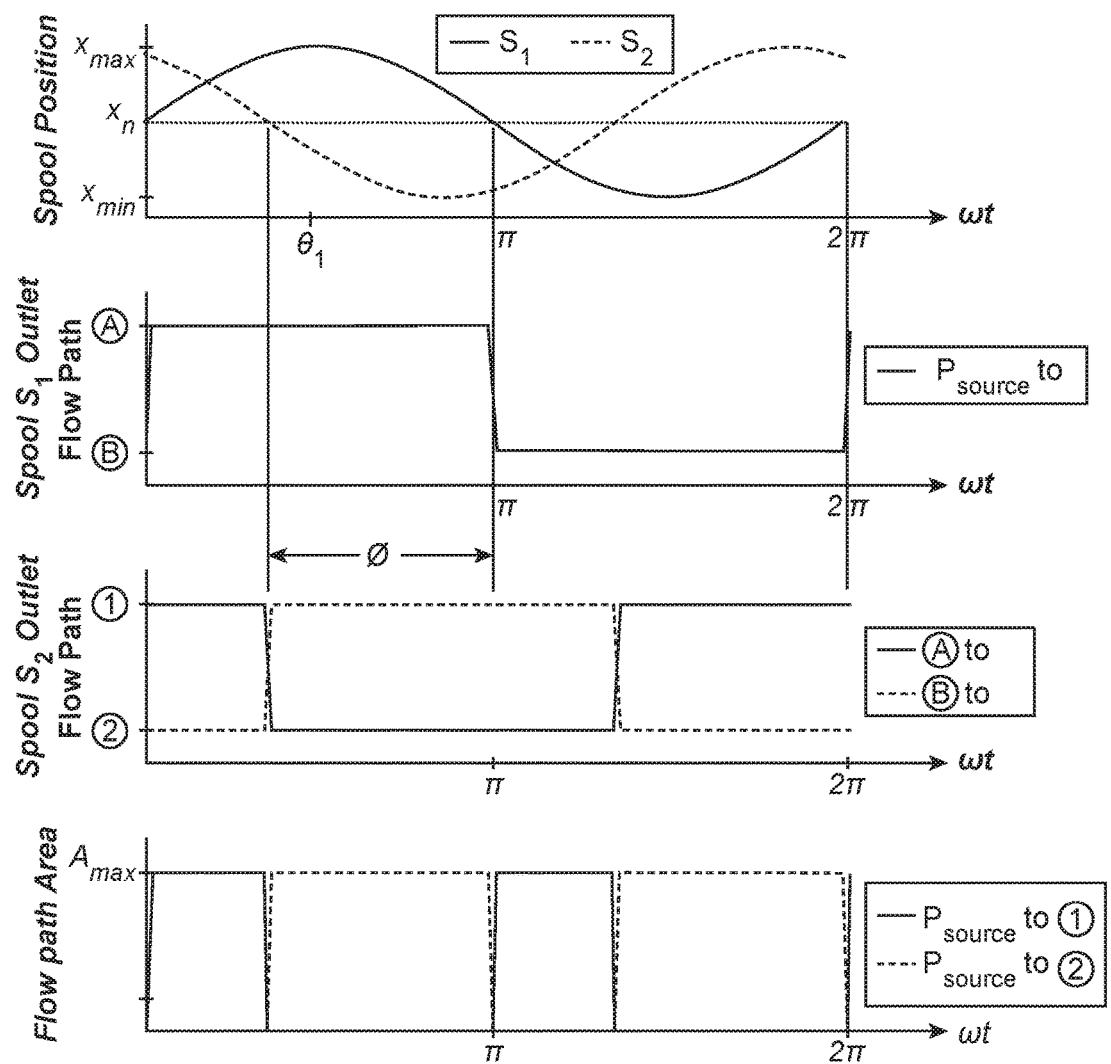
FIG. 8 provides plots of valve spool displacements and flow paths over a full crank rotation of the valve arrangement of FIG. 7.

Continuous duty cycle adjustment can be achieved by adjusting the relative angle between the crank arms to affect a phase shift between the valve spools. FIG. 8 shows the valve displacements and resultant flow paths over two full cycles when the second spool $S_2$ leads the first spool $S_1$ by the same φ radians shown in FIG. 7. FIG. 8 is thus an example of how a phase shift φ affects a duty cycle. "$x_n$" in the spool position plot of FIG. 8 refers to the spool neutral position. The port labeling convention of FIG. 8 corresponds with the labeled ports of FIGS. 5 and 7. With reference to the "Flow path Area" subplot of FIG. 8, the flow is directed to the second outlet port 2 for a crank angular displacement equal to the φ radian phase shift.

The phase shift can be varied from 0 to π radians, resulting in the first outlet port 1 duty cycles described by Equation (3) below:

$$D = \frac{\pi - \phi}{\pi} \quad (3)$$

where D is the duty cycle of the first outlet port 1, and φ is the phase shift between the two spools $S_1$, $S_2$.

Figure 9:
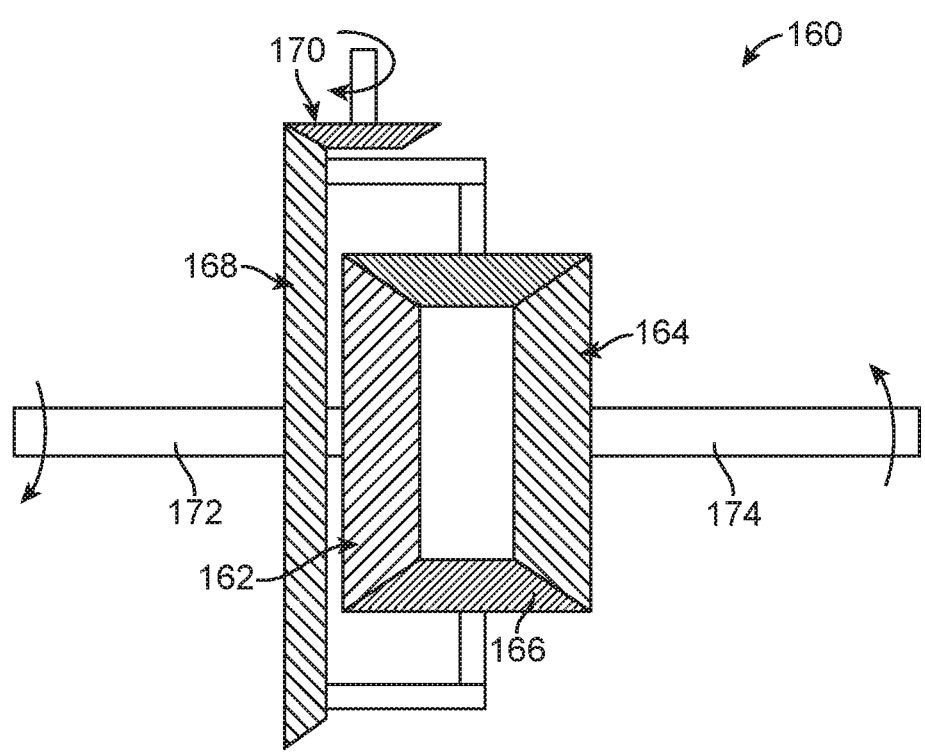
FIG. 9 is a schematic illustration of a phase shift mechanism useful with valves of the present disclosure.

In a critically lapped valve with non-instantaneous transition, a duty cycle of 1 cannot be achieved due to each spool $S_1$, $S_2$ passing through a blocking state on each switching cycle. In this case, the duty cycle is reduced by the ratio of transition time to valve cycle time. The phase shift between the spools $S_1$, $S_2$ is achieved by rotating the crank arms relative to each other on the common crankshaft. In some embodiments, the crank arms are clamped to the crankshaft and the phase shift is adjusted offline. Other embodiments can incorporate on line duty cycle adjustment capability. This can be achieved, for example, by linking the crank arms through a planetary gear train and adjusting the position of the carrier or with a variety of other mechanisms. With this in mind, portions of one example of a phase shift mechanism 160 useful with or as part of the actuator mechanisms and valves of the present disclosure are shown in simplified form in FIG. 9. The phase shift mechanism 160 is akin to a vehicle differential, having a planetary gear set design including a first sun gear 162, a second sun gear 164, planetary gears 166, a ring gear 168, and a pinion gear 170. The first and second sun gears 162, 164 are connected via the planetary gears 166 such that the sun gears 162, 164 rotate in opposite directions (indicated by arrows in FIG. 9). A shaft 172 of the first sun gear 162 is utilized as both the system input and as the driver of the first spool body 32 (FIG. 1) (e.g., the first sun gear shaft 172 drives a link or linkage akin to the first spool linkage 130 (FIG. 1)). A shaft 174 of the second sun gear 164 drives the second spool body 34 (FIG. 1) (e.g., the second sun gear shaft 174 drives a link or linkage akin to the second spool linkage 132 (FIG. 1)). With this construction, the shafts 172, 174 collectively serve as a common crank shaft for the spool bodies 32, 34. Under normal, non-phase shifting operation, the ring gear 168 is held stationary, resulting in an output at the sun gear shafts 172, 174 of equal rotational velocity in opposite directions. To achieve a phase shift, the pinion gear 170 is utilized to rotate the ring gears 168, casing a variation in input and output velocities and thus phase shifting rotation of the sun gear shafts 172, 174. Other phase shift mechanism constructions are also acceptable, capable of facilitating online or in-operation adjustment of the duty cycle by a user and that may or may not incorporate a gear set (e.g., a timing belt-based construction, electromagnetic format, etc.).

Figure 10:
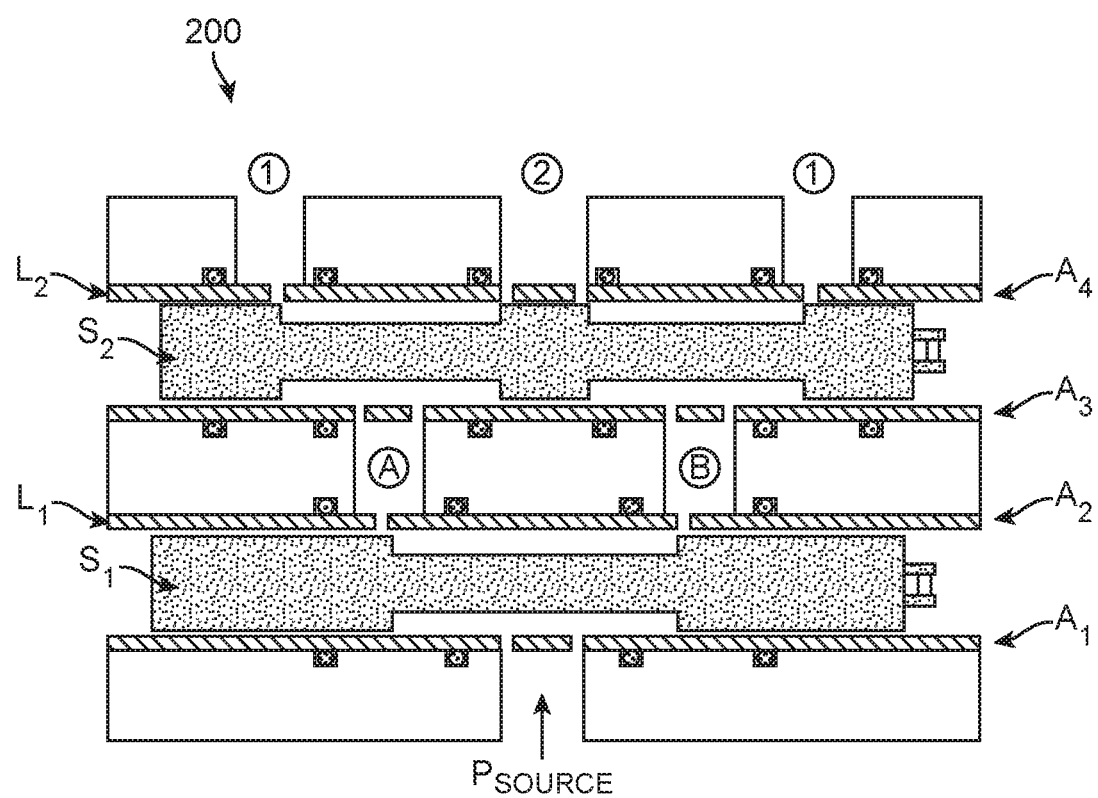
FIG. 10 is a schematic illustration of a portion of another valve in accordance with principles of the present disclosure.

Portions of another embodiment valve 200 in accordance with principles of the present disclosure are shown in FIG. 10. The valve 200 is highly akin to the above descriptions, and includes first and second spools $S_1$, $S_2$ slidably disposed within a housing assembly. The housing assembly forms the inlet port, the internal ports A, B, and the outlet ports 1, 2 as described above. In addition, the valve 200 includes first and second sleeves $L_1$, $L_2$. The first sleeve $L_1$ is assembled to the first bore of the housing assembly, and slidably receives the first spool $S_1$; the second sleeve $L_2$ is assembled to the second bore of the housing assembly, and slidably receives the second spool $S_2$. Each of the sleeves $L_1$, $L_2$ define various orifices (e.g., the sleeves $L_1$, $L_2$ can be referred to as a "ported sleeve"), with the valve 200 employing a clearance seal (or O-ring seal) between the spool $S_1$, $S_2$ and the corresponding ported sleeve $L_1$, $L_2$. The sleeves $L_1$, $L_2$ each have rows of radially drilled ports orifices at the locations reflected in FIG. 10, which are covered and uncovered by the lands on the spools $S_1$, $S_2$ during operation of the valve 200 (it being understood that the actuator mechanism described above is omitted from the view of FIG. 10). Ports distributed circumferentially around the sleeves $L_1$, $L_2$ can balance the pressure and flow forces on the spools $S_1$, $S_2$. In FIG. 10, the sleeve port rows are represented by a single orifice location and corresponding orifice area $A_1$, $A_2$, $A_3$, $A_4$. The sleeves $L_1$, $L_2$ each fit into the valve housing assembly otherwise forming the various ports and containing the O-ring seals. This design allows the low-mass sleeves $L_1$, $L_2$ to "float" and thermally expand at a similar rate to the spools $S_1$, $S_2$ during startup to avoid binding. Additionally, using the sleeves $L_1$, $L_2$ can make manufacturing easier, as the precision ports can be drilled prior to sleeve installation.

EXAMPLES

A valve in accordance with principles of the present disclosure and in accordance with the configuration of FIG. 10 was modeled and analyzed. The design flow rate and maximum pressure were selected as 22.8 liters/min and 34.5 MPa respectively. The target pressure drop through the valve in the on-state at the rated flow was 345 kPa, which correlates to a 1% loss of the rated source pressure. The operating frequency of the valve was 120 Hz, which is achievable by driving the crankshaft with a 3600 rpm AC induction motor. This cyclic rate allows operation in the range of switching frequencies above and below the natural frequency of laboratory scale inertance tubes in a switched inertance hydraulic system topology.

The valve was determined to be in the 'on' state when the pressure drop across the active flow path is less than 345 kPa at rated flow. The transition time is the time required to transition from a blocked state (orifices or ports fully blocked) to the on-state. A transition ratio parameter is defined as the ratio of transition time to switching period. A transition ratio of 5% was selected to diminish transition throttling losses and allow for an absolute duty cycle of 0.9 (based on two transition periods per valve switching period). This ratio is independent of the valve cyclic frequency and depends solely on valve and driving linkage geometry.

The pressure drops through the valve were broken into primary and secondary losses. The primary losses consisted of the losses through the sleeve ports, which must be small in diameter for fast valve transition. The secondary pressure losses consisted of the pressure drops at inlet port, circumferential travel around the sleeve, and axial flow within the spool grooves. The dimensions of the spool and porting within the housing were selected such that the secondary pressure drops were minor relative the pressure drops through the ports in the valve sleeves.

The pressure drop through each row of ports in the respective sleeve can be described as in Equation (4) below:

$$\Delta P = \frac{\rho}{2}\left(\frac{Q}{C_d A_o N}\right)^2 \qquad (4)$$

where N is the total number of radial orifices in a row, $\rho$ is the density of the hydraulic fluid, Q is the volumetric flow rate, $C_d$ is the discharge coefficient, and $A_o$ is the open area of a single orifice.

Figure 11:
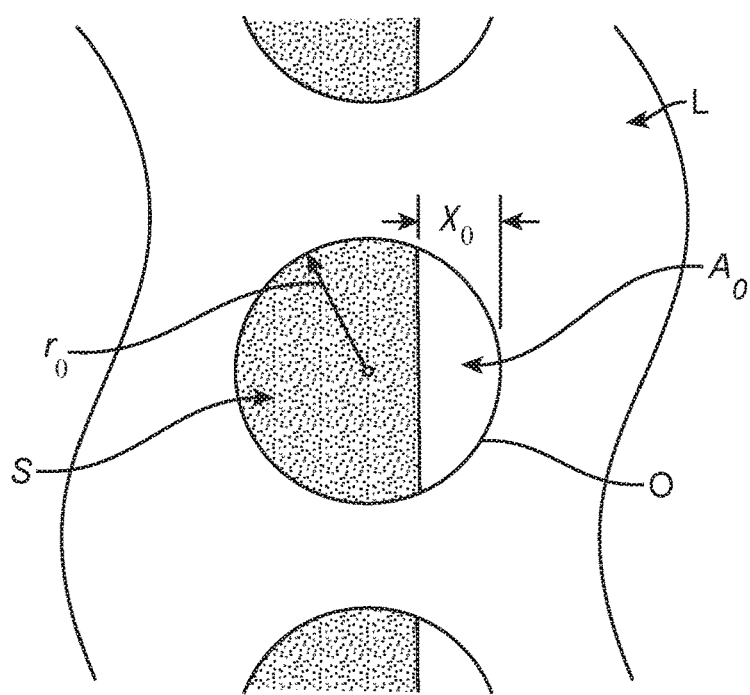
FIG. 11 is an enlarged plan view of a portion of the valve of FIG. 10, illustrating port orifice area during valve transition.

During transition, the spool land covers or uncovers a row of circular ports. The area of the port orifices are a function of the axial spool position, as shown in FIG. 11. As a point of reference, in the plan view representation of FIG. 11, a portion of the valve sleeve L is shown, along one complete port orifice O defined by the valve sleeve L. The valve spool S is visible through the port orifice O; at the point in time of the duty cycle of the valve spool S of FIG. 11, less than an entirety of the port orifice O is covered by the valve spool S, such that an area $A_o$ of the port orifice O remains open.

The present disclosure is not limited to circular ports or orifices shown in FIG. 11; in other embodiments, any other shape or configuration can be employed. For example, the port orifices can be annular or circumferential grooves, have an elongated shape, etc.

With reference to the non-limiting circular ports of FIG. 11, the open area $A_o$ of an individual port is determined by Equation (5) below:

$$A_o = r_o^2 \cos^{-1}\left(\frac{r_o - x_o}{r_o}\right) - (r_o - x_o)\sqrt{2r_o x_o - x_o^2} \quad (5)$$

where $r_o$ is the port radius, $x_o$ is the distance between the spool land (spool neutral position) and the open edge of the orifice, and $A_o$ is the area of the open orifice.

With reference to FIG. 10, each flow path established by the valve contained four port orifice banks through which to pass, with the orifice areas designated $A_1$ closest to the source of flow through $A_4$ at the outlet. The port banks were in series, with pressure drop through the valve equal to the sum of the pressure drop through each row of ports as reflected by Equations (6)-(8) below:

$$\Delta P = \frac{\rho Q^2}{2C_d^2}\left(\frac{1}{(A_1 N_1)^2} + \frac{1}{(A_2 N_2)^2} + \frac{1}{(A_3 N_3)^2} + \frac{1}{(A_4 N_4)^2}\right) \quad (6)$$

$$\Delta P = \frac{\rho Q^2}{2C_d^2 A_{eff}^2} \quad (7)$$

$$A_{eff} = \left(\frac{1}{(A_1 N_1)^2} + \frac{1}{(A_2 N_2)^2} + \frac{1}{(A_3 N_3)^2} + \frac{1}{(A_4 N_4)^2}\right)^{-0.5} \quad (8)$$

where $A_{eff}$ is the effective area of the four series sleeve port locations. Orifice areas $A_2$ and $A_4$ are described by Eq. (5) during transition, while areas $A_1$ and $A_3$ are never blocked by the valve spool, so are the area of the circular ports. $A_1$ and $A_3$ can be composed of two rows of orifices to further reduce the pressure drop within the flow path, simplifying the effective area as in Equation (9) below:

$$A_{eff} = \left(\left(\frac{2}{\frac{\pi d_o^2}{4} 2N}\right)^2 + \frac{1}{(A_2 N)^2} + \frac{1}{(A_4 N)^2}\right) \quad (9)$$

where N is the number of ports in a single row, $d_o$ is the port diameter and $A_2$ and $A_4$ are described by Eq. (5) during transition.

Considering Eq. (6), the pressure drop across valve is a function of the sleeve port open area and the number of sleeve orifices. When $\Delta P$ is less than 345 kPa at 22.8 L/min flow, the flow path is considered to be in the 'on' state. Based on the size and number of orifices, transition to the on-state may occur while ports are still partially blocked.

Eq. (5) shows that $A_2$ and $A_4$ during transition are a function of the axial position of the valve spool. The velocity of the valve spool then dictates the time rate of change of pressure across a row of ports through Eq. (5) and (6) and hence the transition time. The velocity of the spool is most influenced by the crank length for a given input angular velocity as stated in Eq. (2).

The greatest pressure drop scenario occurs when both spools are in phase and transitioning through the neutral position. At this time, the port banks designated $A_2$ and $A_4$ are partially blocked simultaneously. A similar condition occurs when the spools are π radians out of phase. At other phase shifts, only one bank of ports transitions at a time. The analysis performed in the following discussions assumes that the spools are in phase.

For ease of manufacturing the example valve, it was decided that the ports in a row should be spaced 30% of their diameter away from each other circumferentially based on their spacing at the inside wall of the sleeve. In this way, the inside circumference of the sleeve and thus diameter of the spool becomes a function of the number and diameter of ports in a particular row as in Equation (10) below:

$$d_{spool} = \frac{1.3 N d_o}{\pi} \quad (10)$$

where $d_o$ is the sleeve port diameter and $d_{spool}$ is the diameter of the spool.

As the number and diameter of sleeve ports increases, the pressure drop across the valve for a given spool position is decreased. Increasing N and $d_o$ also increases the required diameter of the spool per Eq. (10) which comes at the cost of increased leakage flow through the clearance seal between the sleeve and the spool based on a parallel plate approximation of the annulus as reflected by Equation (11) below:

$$Q_{leak,pp} = \frac{\pi d_{spool} c^3 \Delta P}{12 \mu L_{leak}} = \frac{\pi d_{spool} c^3 \Delta P}{12 \mu x(\theta)} \quad (11)$$

where $d_{spool}$ is the spool diameter, c is the radial clearance between the valve spool and sleeve, $\Delta P$ is the pressure difference between the pressurized flow and ambient, µ is the dynamic viscosity of the hydraulic fluid, and $L_{leak}$ is the length of the leakage path. In all cases, the leakage flow was evaluated with $\Delta P$=34.5 MPa. The value of c is limited by achievable machining tolerances.

Figure 12:
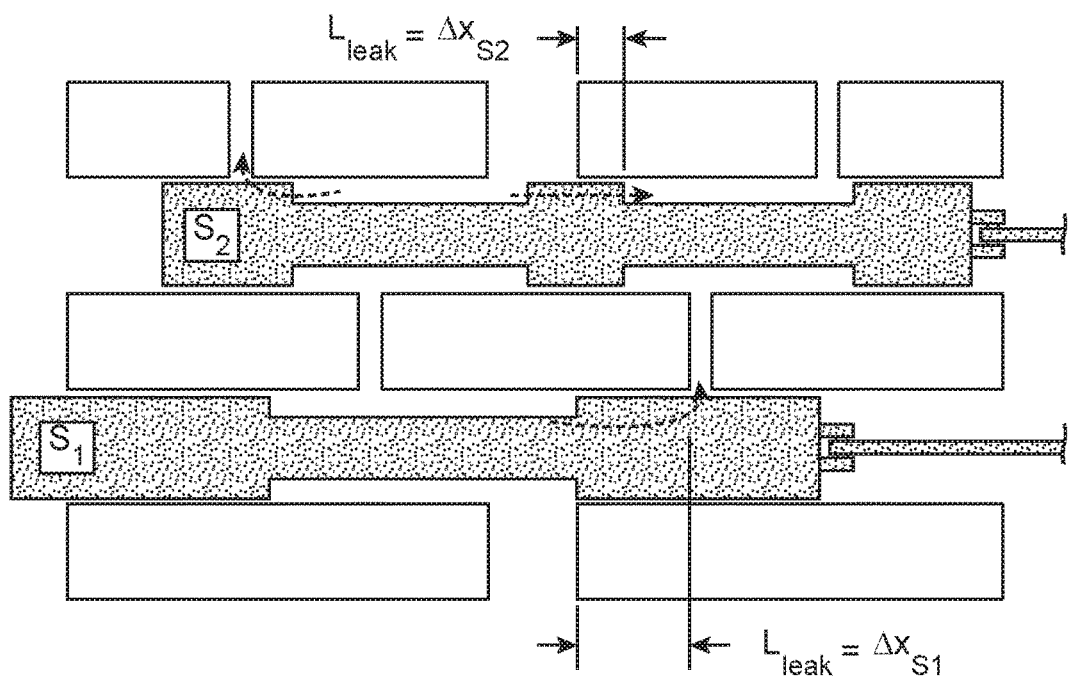
FIG. 12 is a diagram showing possible leakage paths of the valve of FIG. 5.

The major leakage paths are between the valve ports within the spool as indicated in FIG. 12 where the leakage path length $L_{leak}$ is the instantaneous axial displacement of the spool. The length of the leakage paths are the respective spool displacements relative to the corresponding neutral position.

When a spool is at zero displacement, the leakage predicted by Eq. (11) would be infinite. To address this, the leakage flow model is switched to an orifice equation, based the annular clearance area around the spool, once the flow predicted by the parallel plate leakage exceeds the flow predicted by the orifice model represented by Equation (12) below:

$$Q_{leak,o} = C_d A_{annulus} \sqrt{\frac{2 \Delta P}{\rho}} = C_d (\pi d_{spool} c) \sqrt{\frac{2 \Delta P}{\rho}} \quad (12)$$

Valve leakage to ambient is controlled by increasing the length of the lands at the ends of the spools. The length of the lands is penalized by increased viscous power dissipation in the fluid in the clearance between the spool and the sleeve. The viscous friction force is calculated with a parallel plate approximation of the annulus, and calculating the force from shear stress from Couette flow as represented by Equation (13) below:

$$F_{vis} = -\pi d_{spool} L \mu \frac{v(\theta)}{c} \quad (13)$$

where $F_{vis}$ is the viscous friction force, L is the total length of the spool lands, $\mu$ is dynamic viscosity, c is the radial clearance between the spool and the sleeve and $v(\theta)$ is the spool velocity.

Modeling of the example valve began with the key valve requirement that a 345 kPa on-state pressure drop that must be achieved within 5% of the valve switching cycle at the rated flow rate. The valve crank arms were powered by a 3600 rpm AC induction motor, yielding a constant angular crank velocity, $\omega=120\ \pi$rad/s. In order for the 5% transition ratio to be met, transition to the on-state must occur prior to an angular crank displacement of $\pi*0.05=0.157$ rad with respect to the neutral position.

Equation (1) yields an axial spool displacement for angular displacement in terms of crank length and coupler length. The l/r ratio of coupler length to crank link length is assumed to be 5 as a reasonable tradeoff between compactness and acceptable transmission angles. Rearranging Eq. (1) to solve for the spool displacement at $0.05\pi$ angular displacement and an l/r ratio of 5 yields Equation (14) below:

$$x(0.05\pi)=0.1589r \quad (14)$$

where r is the length of the crank arm.

Equations (7) and (9) demonstrate that the pressure drop through the active flow path is a function of instantaneous sleeve port orifice areas and the number of port orifices.

At an angular crank displacement of $0.057\pi$, the spool displacement described in Eq. (14) is the valve spool displacement ($x_0$) used to calculating the port open area $A_2$ and $A_4$ in Eq. (5). Thus, there is a minimum required crank length to achieve the 5% transition ratio for a given number and diameter of sleeve ports.

Figure 13:
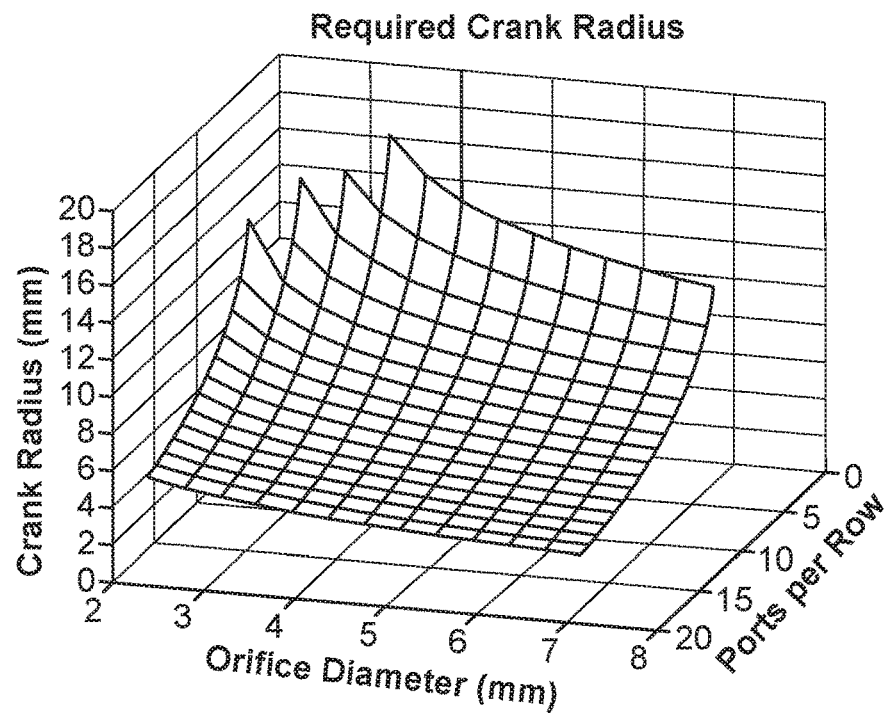
FIG. 13 is a plot of number of ports, orifice diameter and crank length for a modeled valve described in the Examples section of the present disclosure.

FIG. 13 plots a relationship between the number of ports in a row, a diameter of the ports, and crank length, and shows the required crank link length to achieve 5% transition for a range of port diameters and number of ports in an individual row.

The absolute value of the spool velocity over a cycle increases as crank length increases, per Eq. (2), resulting in higher viscous friction force given the same radial clearance between the spool and the sleeve, per Eq. (13). The clearance c can be increased to reduce the friction forces, but at the cost of increased leakage, per Eq. (11) and (12).

The energy loss over a cycle is the sum of the leakage and viscous friction losses as in Equation (15) below:

$$E_{loss} = \frac{1}{\omega} \int_0^{2\pi} \Delta P Q_{leak}(\theta)\, d\theta + \frac{1}{\omega} \int_0^{2\pi} |F_{vis}(\theta) v(\theta)|\, d\theta \quad (15)$$

where $E_{loss}$ is the energy loss over a cycle due to leakage and viscous friction, $\Delta P$ is the difference between maximum rated pressure of the valve and ambient pressure and $\omega$ is the crank rotational velocity.

Figure 14:
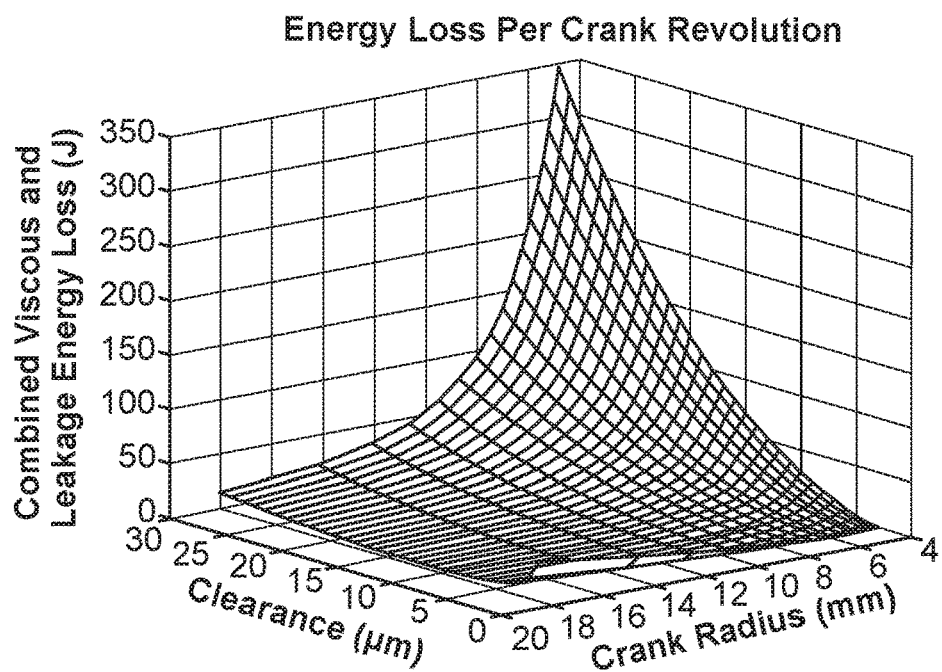
FIG. 14 is a plot of crank length, radial clearance and energy loss for a modeled valve described in the Examples section of the present disclosure.
Figure 15:
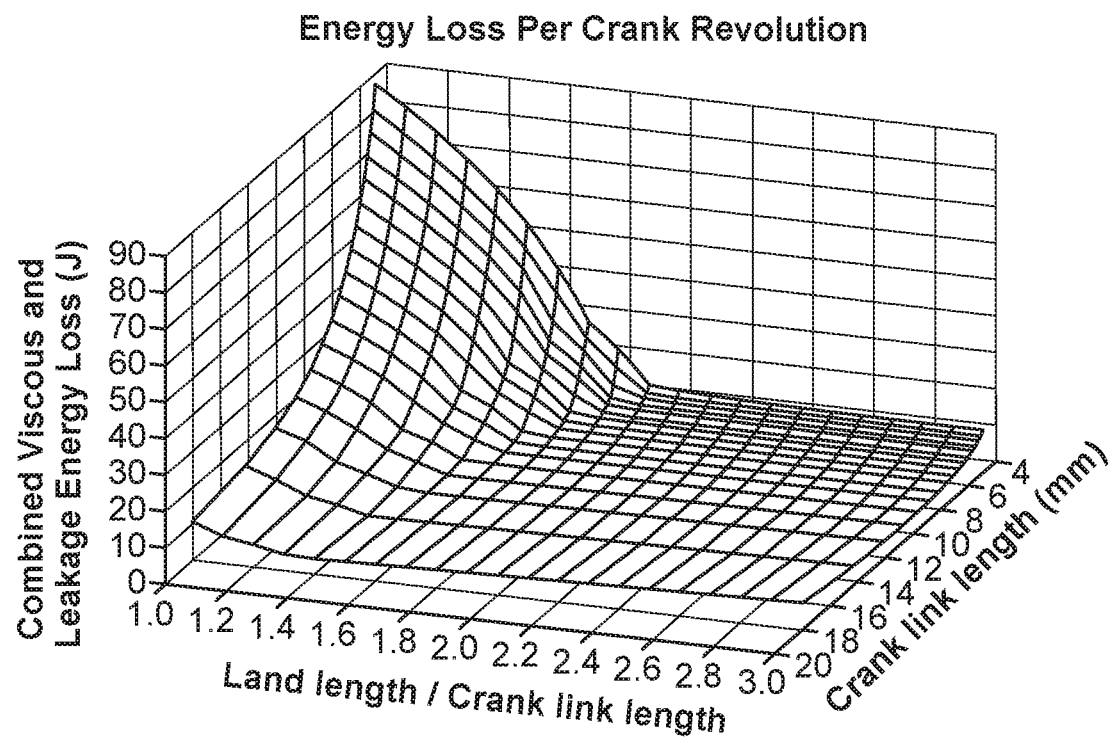
FIG. 15 is a plot of crank length, nondimensionalized spool land length, and energy loss for a modeled valve described in the Examples section of the present disclosure.

The spool velocity, $v(\theta)$, is evaluated using Eq. (2). The energy loss for a given crank length is plotted in FIG. 14 when spool land lengths are assumed to be 1.5*r. FIG. 14 indicates that clearances should be minimized until a clearance value of 2 $\mu$m, at which value viscous friction becomes the major loss mechanism. The practical values of the radial clearance between the spool and sleeve are limited by manufacturing tolerance, and 10 $\mu$m was selected as a minimum achievable value. As the valve lands increase in length, there is an increase in viscous forces per Eq. (12), but a reduction in leakage loss. FIG. 15 illustrates this relationship, with a 10 $\mu$m radial clearance applied. In particular, FIG. 15 is a plot of energy loss over a cycle vs. the crank length and nondimensionalized spool land length.

In FIG. 15, the lowest per cycle losses are achieved for all crank link lengths when the spool land lengths are 2 times the length of the crank link. Energy loss as a function of crank length was then re-evaluated with a land length 2 times the crank length to find the optimal crank link length for a given radial clearance of 10 $\mu$m as shown in FIG. 16.

Figure 16:
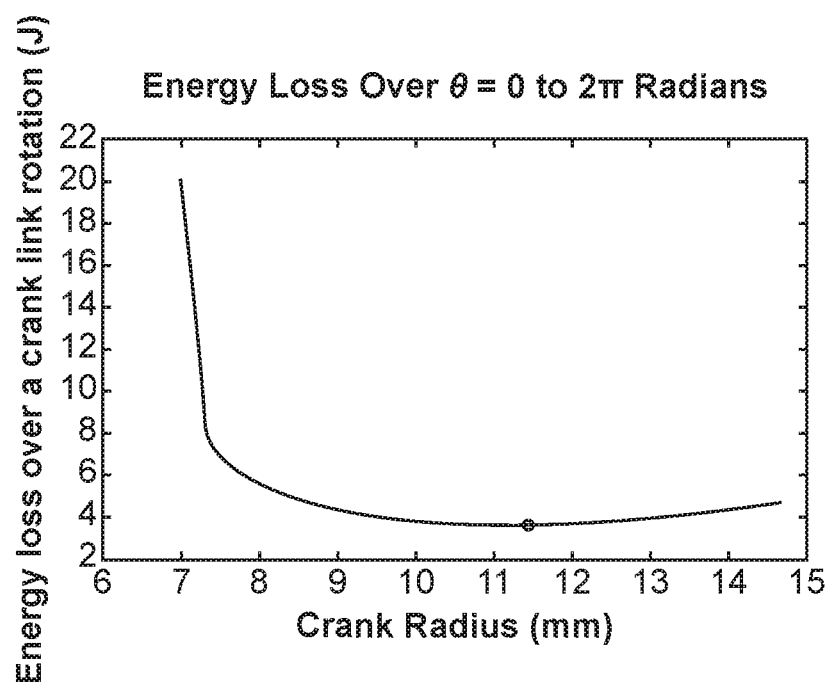
FIG. 16 is a plot of energy loss and crank length for a modeled valve described in the Examples section of the present disclosure.

With reference to FIG. 16, the optimal crank length that minimizes energy loss over a full crank rotation is 11.43 mm. At short crank lengths, the leakage flow paths are small and leakage is the major loss mechanism. At long crank lengths, the viscous friction forces become the major loss mechanism.

The surface generated in FIG. 13 is referenced to find the number of ports and port diameter required for transition ratio of 5% given the optimized crank length. Eight ports per row was selected to evenly distribute radial flow into the spool grooves, and for ease of manufacture. With N=8 ports per row, the required orifice diameter is 2.79 mm.

The process outlined above resulted in an optimal crank length from which the sleeve port diameter was calculated, assuming 8 ports per row. Table 1 below outlines the some design parameters of a slider valve which is capable of a 5% transition ratio at a rated flow of 22.8 L/min and rated pressure of 34.5 MPa.

TABLE 1

Valve Design Optimization Results

| Attribute | Value |
| --- | --- |
| Orifice Diameter, $d_o$ | 2.79 mm |
| Num. of Orifice, N | 8 (outlet row, $A_2$, $A_4$) |
|  | 8 × 2 rows (inlet row, $A_1$, $A_3$) |
| Crank Length, r | 11.43 mm |
| Spool Diameter, $d_{spool}$ | 9.23 mm |
| Radial Spool Clearance, c | 10 $\mu$m |

Figure 17:
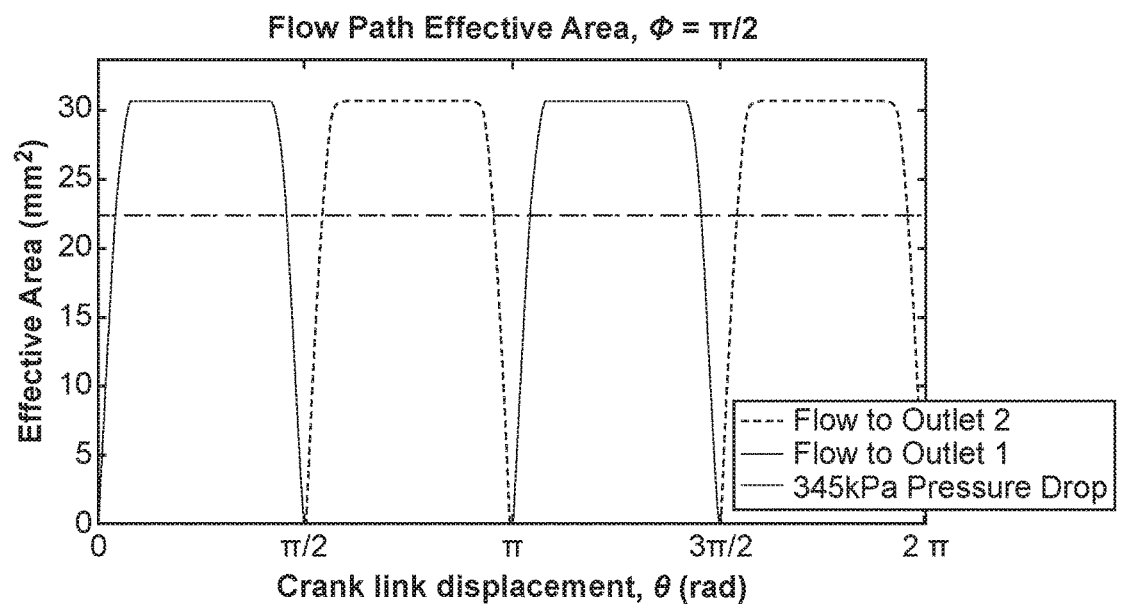
FIG. 17 is a plot of crank link displacement vs. flow path effective area for a modeled valve described in the Examples section of the present disclosure.

The effective area of the two outlet flow paths vs. crank link displacement at spool phase shift, $\phi=\pi/2$ is shown in FIG. 17. The dashed horizontal line in the figure indicates the effective area that results in a pressure drop of 345 kPa through the active flow path. The transition ratio is calculated as the time for an active flow path to achieve this effective area, divided by the valve switching frequency. For this optimized geometry, the transition ratio is 5.0% resulting in a minimum transition time of 0.42 ms.

Figure 18:
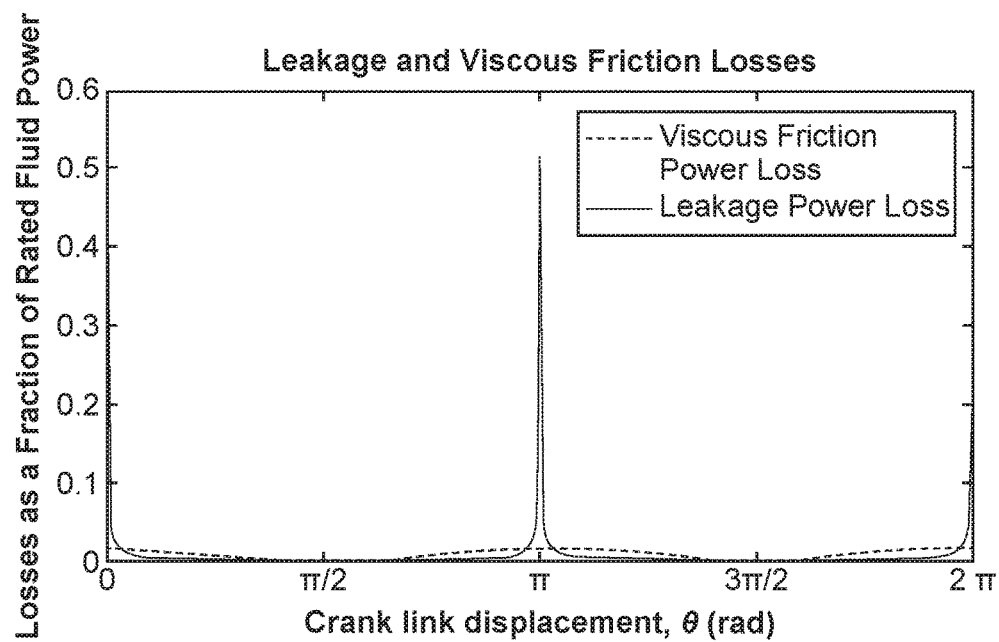
FIG. 18 is a plot of crank link displacement vs. power losses as a fraction of rated fluid power for a modeled valve described in the Examples section of the present disclosure.

The leakage and viscous friction losses are displayed as a fraction of flow power at the rated volumetric flow rate and pressure in FIG. 18. The peak values of leakage loss occur at the neutral point which is where the shortest leakage paths occur, generating the large increases in power loss at 0 and $\pi$ crank angles. The viscous friction losses are proportional to the axial velocity of the spool but are small compared to the leakage losses. When integrated over $2\pi$ radians of crank displacement at an angular velocity of $120\pi$ radians per second, the energy loss due to leakage and viscous friction is 1.7% of rated flow energy over the same time.

Figure 19:
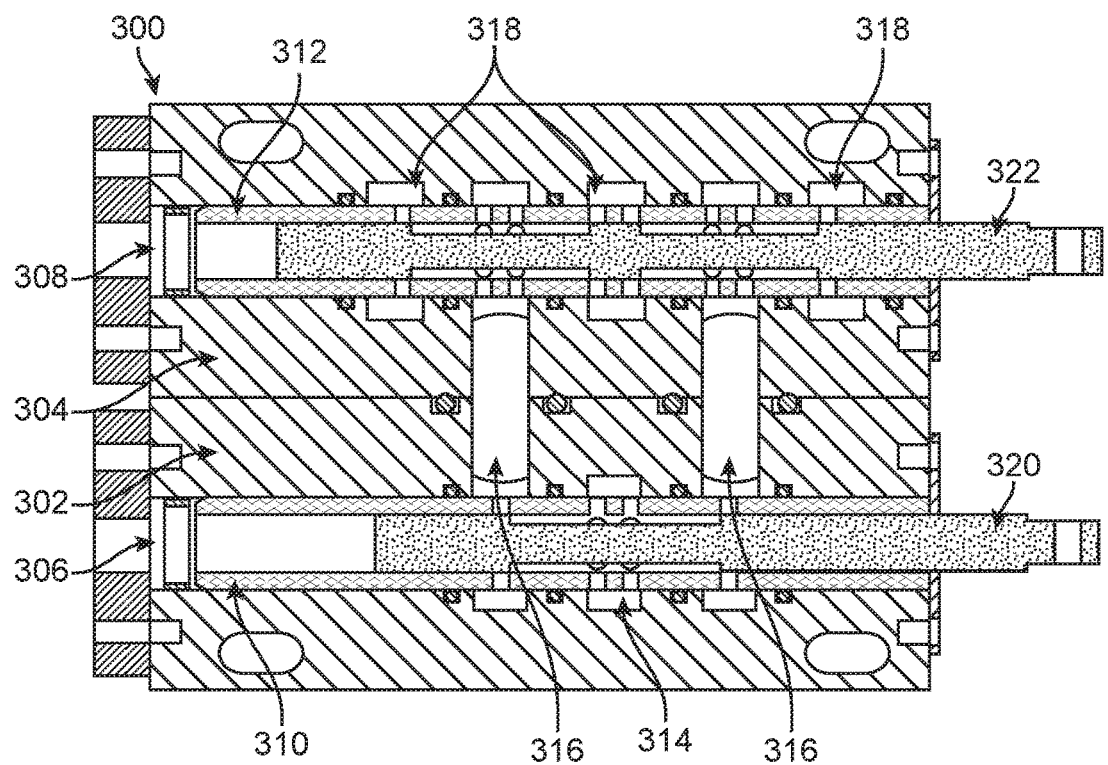
FIG. 19 is a schematic illustration of a portion of a valve described in the Examples section of the present disclosure.

A simplified representation of the valve design of the Examples section is provided in FIG. 19. The valve construction included a valve block 300 formed or defined by first and second valve block sections 302, 304. Each block section 302, 304 defined a bore 306, 308 lined with a sleeve 310, 312, respectively. An inlet or inlet port 314 to the first bore 306, intermediate ports 316, and outlets or outlet ports 318 from the second bore 308 are also identified. A first spool 320 was slidably disposed within the first bore 306, and a second spool 322 was slidably disposed within the second bore 308. The valve block 300 was constructed of aluminum, while the sleeves 310, 312 and the spools 320, 322 were constructed from steel. The spools 320, 322 had a lower hardness as compared to the sleeves 310, 312, and were the wear component during startup. It was viewed as being desirable to have the spools 320, 322 and the sleeves 310, 312 expand equally as they came up to operating temperature during startup to avoid binding. As the block 300 had significantly more thermal mass and would not expand as quickly during warmup, low-mass sleeves 310, 312 were utilized that expanded with the spools 320, 322. Adjacent orifices were separated by O-rings installed in the block 300. The inlet and outlet ports 314, 318 were located in the top of the valve block 300, directed into the plane of FIG. 19. The intermediate ports 316 in the valve block 300 were annular grooves, which allowed the flow to enter the circumferentially distributed sleeve ports. Both ends of each of the spools 320, 322 were exposed to ambient, which pressure balanced the valve. In this non-limiting design iteration, leakage flowed to ambient and was collected in a reservoir.

Although the present disclosure has been described with reference to preferred embodiments, workers skilled in the art will recognize that changes can be made in form and detail without departing from the spirit and scope of the present disclosure. For example, while some of the valves of the present disclosure have been described as being configured to allow two cycles per revolution of the crankshaft, other constructions are also envisioned. The number of cycles per revolution can be increased by providing a valve of similar architecture that transitions at $\pi/4$, $3\pi/4$, $5\pi/4$, and $7\pi/4$ radians, compared with other designs of the present disclosure that transition at $\pi$ and $2\pi$ radians.

What is claimed is:

1. A valve comprising:
 a housing assembly defining:
  a first bore,
  a second bore defining a central axis,
  an inlet fluidly open to the first bore,
  first and second intermediate ports each fluidly open to the first and second bores,
  first and second outlets each fluidly open to the second bore,
  first and second outlet ports fluidly open to the second bore and fluidly connected to the first outlet,
  a third outlet port fluidly open to the second bore and fluidly connected to the second outlet,
  wherein the first intermediate port is offset from each of the first, second and third outlet ports in a direction of the central axis,
  and further wherein the second intermediate port is offset from the each of the first, second and third outlet ports in the direction of the central axis;
 a first spool body slidaby disposed within the first bore for selectively establishing:
  an open fluid path between the inlet and the first intermediate port,
  an open fluid path between the inlet and the second intermediate port;
 a second spool body slidably disposed within the second bore for selectively establishing:
  an open fluid path between the first intermediate port and the first outlet,
  an open fluid path between the first intermediate port and the second outlet,
  an open fluid path between the second intermediate port and the first outlet,
  an open fluid path between the second intermediate port and the second outlet; and
 an actuator mechanism linked to the first and second spool bodies;
 wherein the actuator mechanism operates to repeatedly switch the valve between:
  a first condition in which the inlet is fluidly connected to the first outlet,
  a second condition in which the inlet is fluidly connected to the second outlet.

2. The valve of claim 1, wherein the actuator mechanism incorporates a crank slider driven architecture, including a crank shaft linked to the first spool body, and further wherein the actuator mechanism is configured such that with continuous driven rotation of the crank shaft in a single rotational direction, the first spool body is caused to move back-and-forth within the first bore.

3. The valve of claim 1, wherein the actuator mechanism includes a crank shaft linked to the first and second spool bodies.

4. The valve of claim 3, wherein the actuator mechanism is configured such that rotation of the crank shaft drives the first and second spool bodies to translate back-and-forth within the corresponding first and second bore.

5. The valve of claim 3, wherein the actuator mechanism further includes a phase shift mechanism configured to selectively effect a phase shift between motion cycles of the first and second spool bodies.

6. The valve of claim 5, wherein the actuator mechanism operates to drive the first spool body between first spool minimum and maximum displacement positions, and to drive the second spool body between second spool minimum and maximum displacement positions, the first spool minimum and maximum displacement positions being aligned with the second spool minimum and maximum displacement positions, respectively, and further wherein a normal, non-phase shift mode of operation of the actuator mechanism includes the first spool body at the first spool minimum displacement position and the second spool body at the second spool maximum displacement position at a single point in time.

7. The valve of claim 6, wherein the phase shift effected by the phase shift mechanism provides a phase mode of operation in which the first spool body is not at the first spool minimum displacement position when the second spool body is at the second spool maximum displacement position.

8. The valve of claim 1, wherein the first condition includes the spool bodies establishing at least one first condition flow pathway open between the inlet and the first outlet, and the second condition includes the spool bodies establishing at least one second condition flow pathway open between the inlet and the second outlet, and further wherein the second condition flow pathway is closed in the first condition and the first condition flow pathway is closed in the second condition.

9. The valve of claim 8, wherein the valve is configured to provide:

a first arrangement in which the first spool body is positioned to establish an open fluid path between the inlet and the first intermediate port, and the second spool body is positioned to establish an open fluid path between the first intermediate port and the first outlet;

a second arrangement in which the first spool body is positioned to establish an open fluid path between the inlet and the second intermediate port, and the second spool body is positioned to establish an open fluid path between the second intermediate port and the first outlet;

a third arrangement in which the first spool body is positioned to establish an open fluid path between the inlet and the first intermediate port, and the second spool body is positioned to establish an open fluid path between the first intermediate port and the second outlet; and a fourth arrangement in which the first spool body is positioned to establish an open fluid path between the inlet and the second intermediate port, and the second spool body is positioned to establish an open fluid path between the second intermediate port and the second outlet.

10. The valve of claim 9, wherein the first and second arrangement correspond with the first condition, and the third and fourth arrangements correspond with the second condition.

11. The valve of claim 1, wherein the housing assembly includes a sleeve forming the second bore, the sleeve defining the first, second and third outlet ports.

12. The valve of claim 1, wherein the actuator mechanism includes a first crank link connected to a first coupler link, and a second crank link connected to a second coupler link, and further wherein the first coupler link is connected to the first spool body and the second coupler link is connected to the second spool body.

13. The valve of claim 12, wherein the actuator mechanism further includes a crankshaft connected to the first and second crank links.

14. The valve of claim 13, wherein the actuator mechanism is configured such that rotation of the crankshaft effectuates sliding movement of the first and second spool bodies relative to the housing via translation of the crank links.

15. The valve of claim 14, wherein the actuator mechanism is configured to provide a selectively alterable phase shift in movements of the first and second spool bodies.

16. The valve of claim 15, wherein a rotational position of the first and second crank links relative to each other on the crankshaft is selectively alterable.

17. The valve of claim 1, wherein a central axis of the first bore is substantially parallel with the central axis of the second bore.

18. The valve of claim 17, wherein the first spool body is coaxially arranged with the central axis of the first bore, and the second spool body is coaxially arranged with the central axis of the second bore.

19. A switch-mode hydraulic circuit comprising the valve of claim 1.

20. A valve comprising:
a housing assembly defining:
    a first bore,
    a second bore,
    an inlet fluidly open to the first bore,
    first and second intermediate ports each fluidly open to the first and second bores,
    first and second outlets each fluidly open to the second bore;
a first spool body slidaby disposed within the first bore for selectively establishing:
    an open fluid path between the inlet and the first intermediate port,
    an open fluid path between the inlet and the second intermediate port;
a second spool body slidably disposed within the second bore for selectively establishing:
    an open fluid path between the first intermediate port and the first outlet,
    an open fluid path between the first intermediate port and the second outlet,
    an open fluid path between the second intermediate port and the first outlet,
    an open fluid path between the second intermediate port and the second outlet; and
an actuator mechanism including a crank shaft linked to the first and second spool bodies, and a phase shift mechanism configured to selectively effect a phase shift between motion cycles of the first and second spool bodies;
wherein the actuator mechanism operates to repeatedly switch the valve between:
    a first condition in which the inlet is fluidly connected to the first outlet,
    a second condition in which the inlet is fluidly connected to the second outlet;
and further wherein the actuator mechanism operates to drive the first spool body between first spool minimum and maximum displacement positions, and to drive the second spool body between second spool minimum and maximum displacement positions, the first spool minimum and maximum displacement positions being aligned with the second spool minimum and maximum displacement positions, respectively, and further wherein a normal, non-phase shift mode of operation of the actuator mechanism includes the first spool body at the first spool minimum displacement position and the second spool body at the second spool maximum displacement position at a single point in time, and even further wherein the phase shift effected by the phase shift mechanism provides a phase mode of operation in which the first spool body is not at the first spool minimum displacement position when the second spool body is at the second spool maximum displacement position.

* * * * *